United States Patent
Hu et al.

(10) Patent No.: US 11,327,755 B2
(45) Date of Patent: *May 10, 2022

(54) FINE GRAINED CONTROL FLOW ENFORCEMENT TO MITIGATE MALICIOUS CALL/JUMP ORIENTED PROGRAMMING

(71) Applicant: Intel Corporation, Santa Clara, CA (US)

(72) Inventors: Kekai Hu, Portland, OR (US); Ke Sun, Portland, OR (US); Rodrigo Branco, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/946,545

(22) Filed: Jun. 26, 2020

(65) Prior Publication Data

US 2020/0326945 A1 Oct. 15, 2020

Related U.S. Application Data

(63) Continuation of application No. 15/858,479, filed on Dec. 29, 2017, now Pat. No. 10,719,319.

(51) Int. Cl.
| | |
|---|---|
| *G06F 7/38* | (2006.01) |
| *G06F 9/00* | (2006.01) |
| *G06F 9/44* | (2018.01) |
| *G06F 9/30* | (2018.01) |
| *G06F 9/35* | (2018.01) |
| *G06F 9/38* | (2018.01) |

(52) U.S. Cl.
CPC ...... *G06F 9/30058* (2013.01); *G06F 9/30079* (2013.01); *G06F 9/30185* (2013.01); *G06F 9/35* (2013.01); *G06F 9/384* (2013.01)

(58) Field of Classification Search
CPC ............ G06F 9/30058; G06F 9/30079; G06F 9/30185; G06F 9/35; G06F 9/384
USPC ......................................................... 712/236
See application file for complete search history.

(56) References Cited

U.S. PATENT DOCUMENTS

| | | | |
|---|---|---|---|
| 9,361,458 B1 * | 6/2016 | Feng | G06F 21/564 |
| 2008/0184016 A1 | 7/2008 | Erlingsson et al. | |
| 2008/0256347 A1 | 10/2008 | Eickemeyer et al. | |
| 2011/0289300 A1 * | 11/2011 | Beaumont-Smith | G06F 9/3806 |
| | | | 712/205 |
| 2013/0346727 A1 * | 12/2013 | Reddy | G06F 9/3844 |
| | | | 712/205 |
| 2016/0170769 A1 * | 6/2016 | LeMay | G06F 9/35 |
| | | | 713/190 |
| 2017/0185536 A1 | 6/2017 | Li et al. | |
| 2018/0096149 A1 * | 4/2018 | Morkovsk | H04L 63/1416 |

OTHER PUBLICATIONS

Intel "Control-flow Enforcement Technology Preview", Jun. 2017, Revision 2.0, Document No. 334525-002, 145 pages.

* cited by examiner

*Primary Examiner* — Chun Kuan Lee
(74) *Attorney, Agent, or Firm* — Alliance IP, LLC

(57) ABSTRACT

In one embodiment, a processor comprises a decoder to decode a first instruction, the first instruction comprising an opcode and at least one parameter, the opcode to identify the first instruction as an instruction associated with an indirect branch, the at least one parameter indicative of whether the indirect branch is allowed; and circuitry to generate an error message based on the at least one parameter.

20 Claims, 18 Drawing Sheets

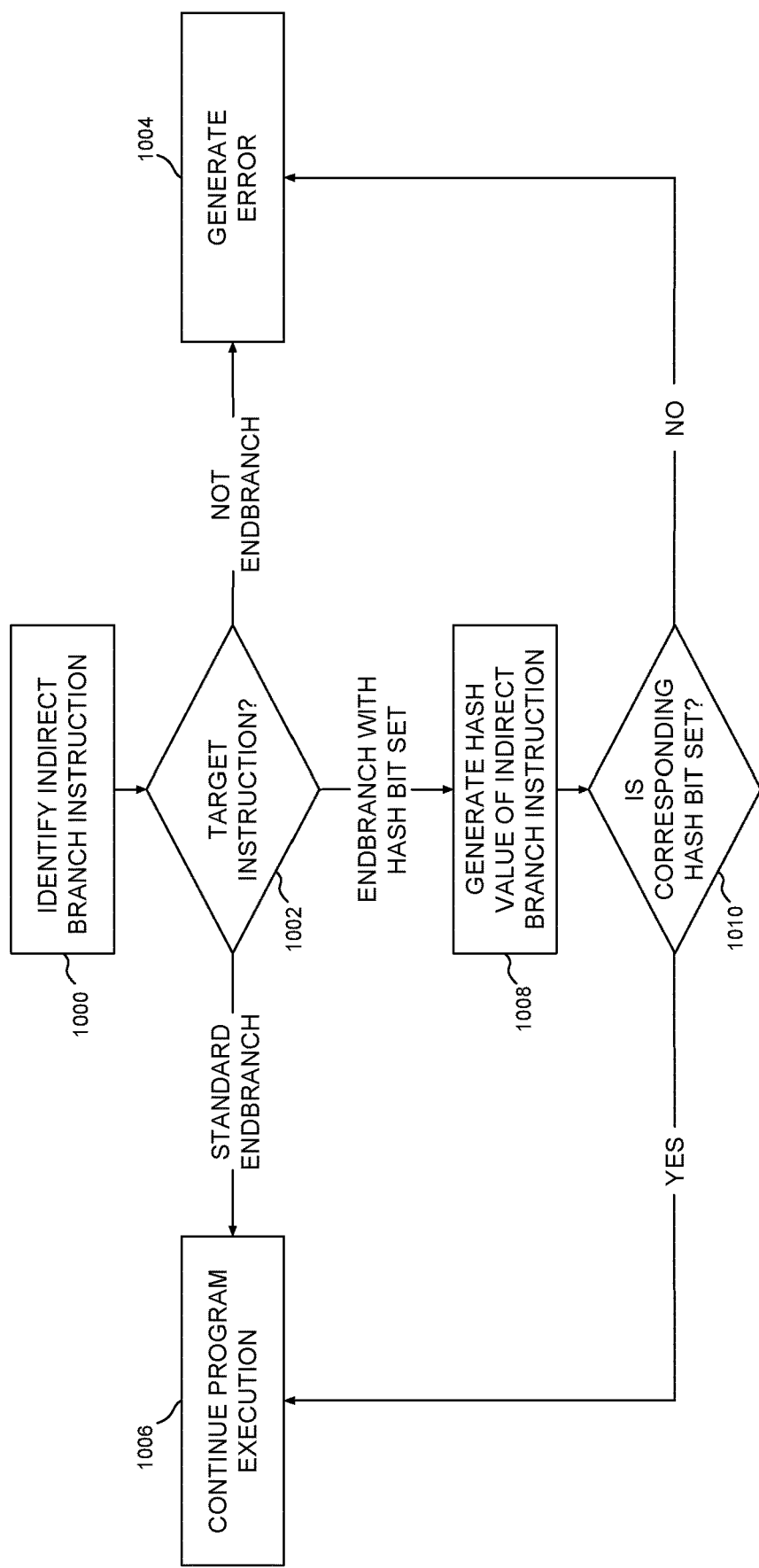

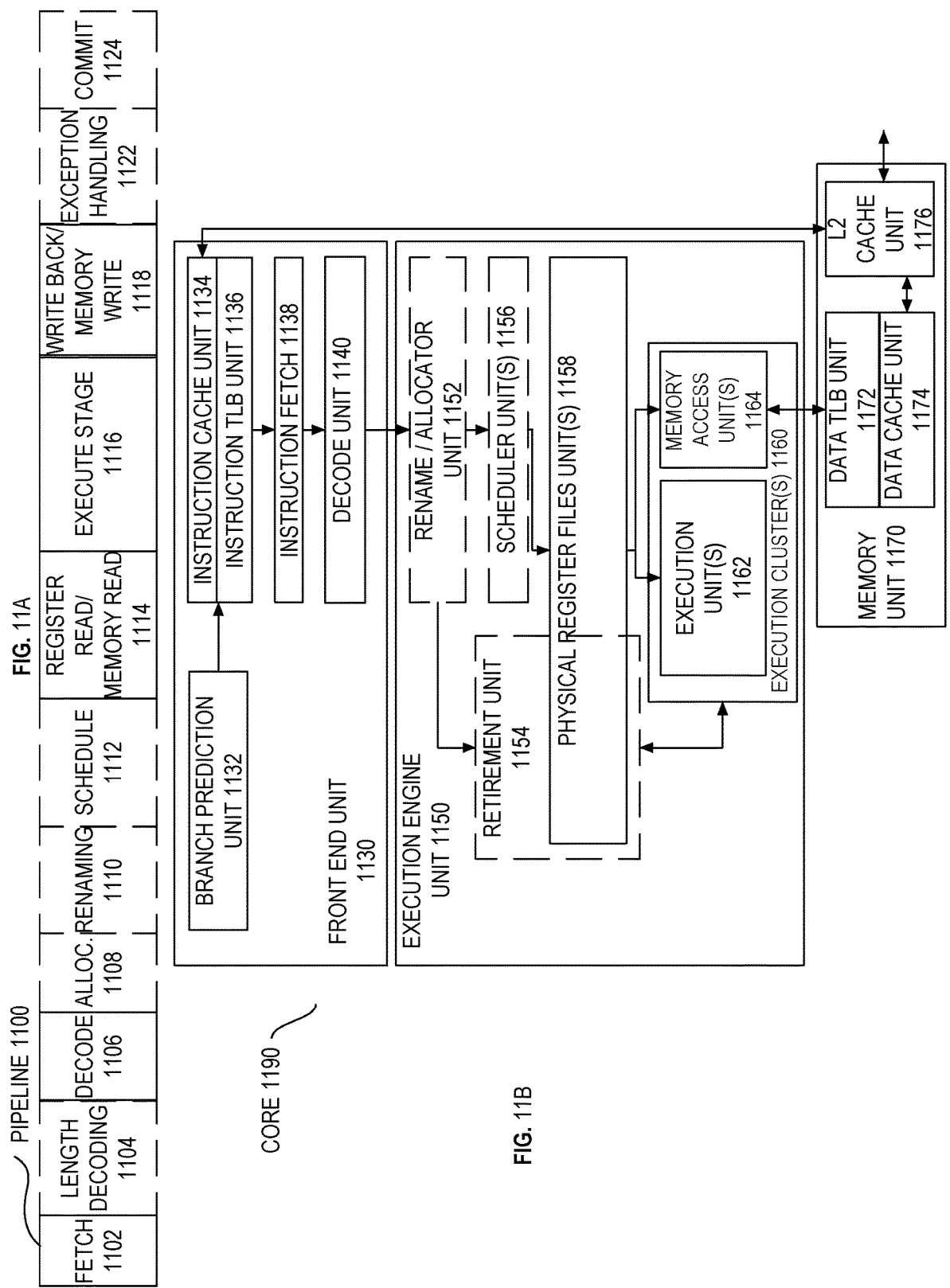

FINE GRAINED CONTROL FLOW ENFORCEMENT TO MITIGATE MALICIOUS CALL/JUMP ORIENTED PROGRAMMING

CROSS-REFERENCE TO RELATED APPLICATIONS

This patent application is a continuation (and claims the benefit under 35 U.S.C. § 120) of U.S. application Ser. No. 15/858,479, filed Dec. 29, 2017, and entitled "FINE GRAINED CONTROL FLOW ENFORCEMENT TO MITIGATE MALICIOUS CALL/JUMP ORIENTED PROGRAMMING," the content of which is hereby expressly incorporated by reference.

FIELD

The present disclosure relates in general to the field of computer development, and more specifically, to program compiling and execution techniques.

BACKGROUND

A computer system may include a processor to execute code of a program. The code may include various instructions. The instructions may include indirect branch instructions which modify the control flow of the program. In some situations, the use of indirect branch instructions may expose the computer system to malicious call/jump oriented programming.

BRIEF DESCRIPTION OF THE DRAWINGS

FIG. 10 illustrates a flow for executing a program comprising endbranch instructions with hash bit sets in accordance with certain embodiments.

FIG. 11A is a block diagram illustrating both an exemplary in-order pipeline and an exemplary register renaming, out-of-order issue/execution pipeline in accordance with certain embodiments.

FIG. 11B is a block diagram illustrating both an exemplary embodiment of an in-order architecture core and an exemplary register renaming, out-of-order issue/execution architecture core to be included in a processor in accordance with certain embodiments;

Like reference numbers and designations in the various drawings indicate like elements.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to specific integrated circuits, such as computing platforms or microprocessors, other embodiments are applicable to other types of integrated circuits and logic devices. Similar techniques and teachings of embodiments described herein may be applied to other types of circuits or semiconductor devices. For example, the disclosed embodiments may be used in various devices, such as server computer systems, desktop computer systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency.

Figure 1:
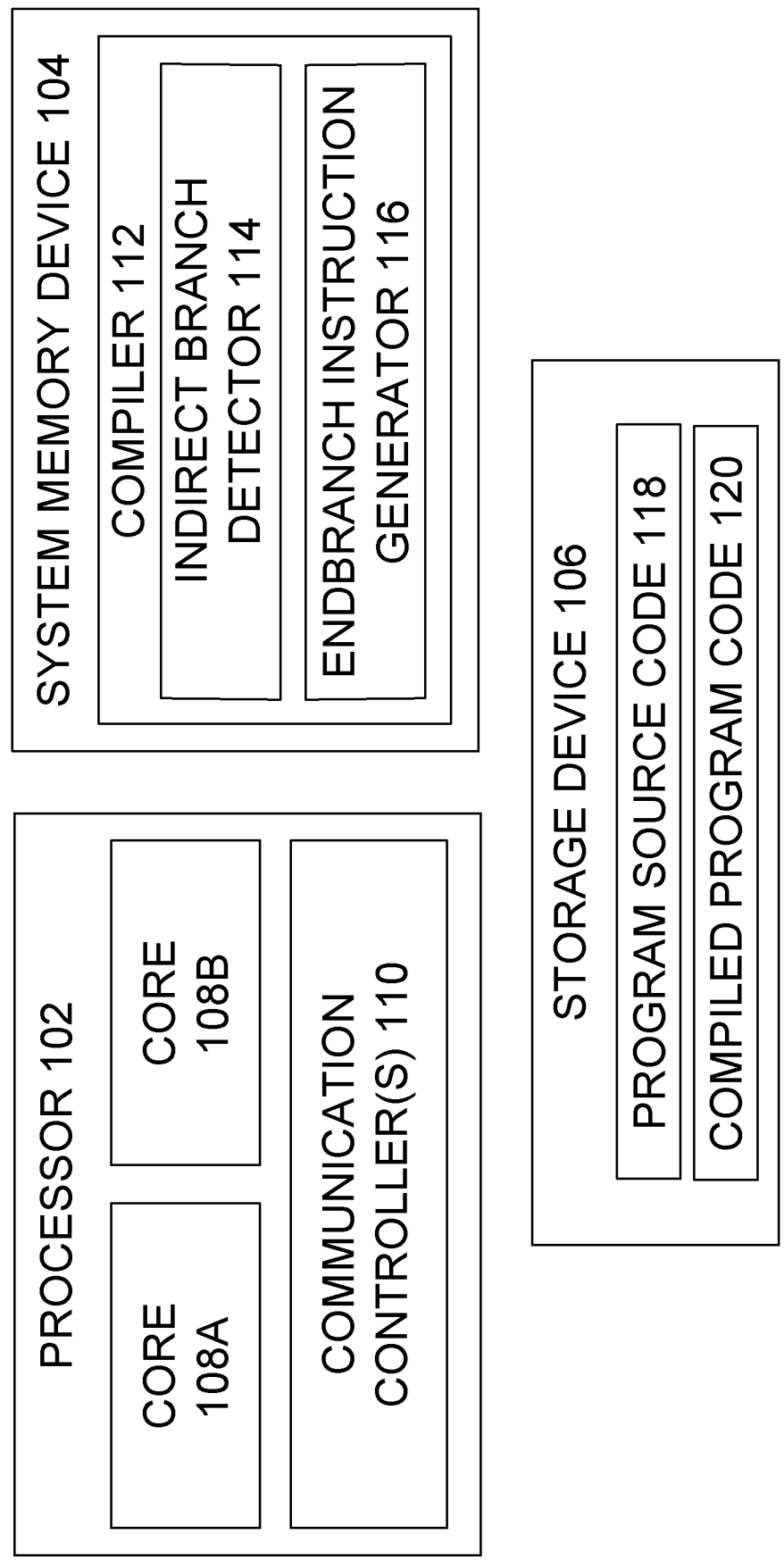
FIG. 1 illustrates a computer system to compile a program in accordance with certain embodiments.

FIG. 1 illustrates a computer system 100 to compile a program in accordance with certain embodiments. Computer system 100 includes a processor 102, a system memory device 104, and a storage device 106. Processor 102 may include any processor or processing device, such as a microprocessor, an embedded processor, a digital signal processor (DSP), a network processor, a handheld processor, an application processor, a co-processor, an SoC, or other device to execute code. Processor 102 may include one or more cores (e.g., 108A and 108B). In a particular embodiment, processor 102 is implemented on a single die. Processor 102 may communicate with system memory device 104 and storage device 106 via communication controller(s) 110.

In operation, processor 102 may execute a compiler 112. For example, code of the compiler may be loaded into system memory device 104 (e.g., from storage device 106) and executed by one or more of the cores 108. In the embodiment depicted, the compiler 112 includes an indirect branch detector 114 to detect code of the program source code 118 that is to be compiled into indirect branch instructions and an endbranch instruction generator 116 to generate endbranch instructions that are placed in the compiled program code 120 to mark allowable targets of indirect branch instructions.

An indirect branch instruction is an instruction that, rather than specifying the address of the next instruction to execute (as in a direct branch), includes an argument specifying a memory location (e.g., a register of processor 102 or other memory location) which stores the memory address of the next instruction (i.e., the target address of the indirect branch instruction) to be executed by a processor. For example, an indirect branch instruction may be an indirect call instruction or an indirect jump instruction. A jump instruction may simply perform a jump to the target address while a call instruction pushes a pointer to the next instruction (e.g., the value of an instruction pointer register) onto a stack and jumps to the target address (e.g., so that the program execution flow may return to the instruction following the call instruction when a return instruction is executed).

An indirect branch instruction may be executed by accessing the memory location specified by the instruction, retrieving the target memory address stored therein, and moving the program execution flow to the retrieved memory address (e.g., by storing the retrieved value in an instruction pointer register). Indirect branch instructions may introduce security vulnerabilities, as the memory locations (e.g., registers) storing the target instruction pointers of the indirect branch instructions may be overwritten by malicious code to hijack the code execution flow.

To mitigate such vulnerabilities, indirect branch tracking may be utilized to defend against such call/jump oriented exploit programming. For example, a compiler may insert an endbranch instruction at the target address of each valid indirect branch instruction. If a program jumps to an invalid target address (e.g., because a register storing a target address of an indirect branch instruction has been maliciously manipulated), an error message may be generated. For example, an exception (e.g., a ring-0 exception) or fault (e.g., a control protection fault) may be generated by the processor and the operating system may terminate the application to protect against the malicious code. If a program jumps to a valid target address (as marked by the endbranch instruction), the program may be allowed to continue execution.

As an example, compiled code of a program may include two functions "main" and "foo":

1: <main>:
2: endbranch
3: push % rbp
4: mov % rsp,% rbp
5: sub $0x10, % rsp
6: movq $0x4004fb, −8(% rbp)
7: mov −8(% rbp), % rdx
8: mov $0x0, % eax
9: call % rdx
10: leaveq
11: retq
12: <foo>:
13: endbranch
14: push % rbp
15: mov % rsp,% rbp
16: leaveq
17: retq In this example, endbranch instructions are added by compiler at line 2 and line 13. During execution of the program, at line 9 the main function calls the foo function using the indirect branch instruction call % rdx. The processor may then check line 13 to see if an endbranch instruction is present. If an endbranch instruction is present, the program execution flow transfers to the instructions of the foo function that follow the endbranch instruction, otherwise, an error message (e.g., an exception or fault) is generated.

While the code above may offer some protection against call/jump oriented exploit programming, such code may permit any part of the program to redirect the flow to line 13 because line 13 is marked as a valid target with an endbranch instruction, even if the address of the indirect branch instruction is not line 9, but is a malicious caller from a different location. In a complex program, many code segments may be marked as valid targets via endbranch instructions, thus enabling attackers to use these code segments to implement valid gadgets that form a Turing complete exploit payload (thus enabling the malicious code to cause any number of malicious functions to be executed using these code segments). Many complex software programs that include multiple modules, such as internet browsers, may include such vulnerabilities.

A module is a discrete portion of a program which includes one or more code blocks that each implement one or more functions. In some situations, modules of a program may be standalone modules that are each independently developed and are not combined together until the program is linked. In some embodiments, one or more modules of a program may each correspond to source code or compiled code located in a respective file (though in other embodiments a module may span multiple files or a multiple modules may be included within a single file). For example, a first module may correspond to source code in a first C or C++ file (or other suitable file type), a second module may correspond to source code in a second C or C++ file, etc. As another example, a first module may correspond to source code in a first dynamic-link library file (or other suitable file type), a second module may correspond to source code in a second dynamic-link library file, etc. In some embodiments, each module may implement an interface that allows code outside of the module to call the module to utilize the functionality of the module (e.g., via an inter-module branch). Each module may include one or more code blocks. One or more of these code blocks may be designed to be accessed by code that is external to the module (e.g., via inter-module branches), though generally speaking, the majority of code blocks of a typical module with a large number of code blocks are designed to be accessible only by other code blocks of the same module (e.g., via intra-module branches). In some instances, the source code of a module may specify the scope of each code block (i.e., whether a particular code block is to be accessible outside of the module or only from within the module), e.g., by specifying whether the code block is global or static, public or private, etc.

Various embodiments of the present disclosure may provide a per-compiling-module-level control flow integrity check mechanism that adds per-module address space information as a parameter in an endbranch instruction to achieve a more granular protection to significantly reduce the available gadgets in call/jump oriented exploit programming. In many modules of a program, the majority of valid indirect branch targets may be internal to the module, such as internal function pointers, callbacks, switch jump tables, or other internal targets and these internal targets don't need to be exported for external access and hence should not be accessible from any external modules. At compile time, these internal targets are identified and a corresponding endbranch instruction with a scope parameter indicating that the target is only accessible from within the module is generated by the compiler. At run time, when an indirect branch target is detected as an internal target, an address of the source indirect branch instruction (i.e., the indirect branch instruction that specified the memory location that included the address of the target) is checked. If the address of the source instruction is outside the address range of the module that includes the target, the processor identifies this indirect branch as an illegal branch and generates an error message.

Another way of solving this control flow integrity problem is to verify the source information (e.g., the source address or the source instruction). While the source address is a unique identification of the calling instruction, the source address generally can't be determined at static compile time when the endbranch instructions are inserted because of the wide deployment of address space layout randomization (ASLR). The source instruction can be determined at compile time, but it's very common for a module to include multiple different instructions that branch to the same target location.

Various embodiments of the present disclosure may provide a hash based control flow integrity check and use source instruction information to identify legal sources for such target calls. A particular embodiment uses hashes of the source instructions to identify valid source instructions and handles the issue of multiple valid sources by using one-hot representation of the instruction hashes, rather than the hashes themselves, as a parameter in the endbranch instruction. In a particular embodiment, endbranch instructions with such parameters are generated for intra-module indirect branches, for which the source instructions are available at compile time, but inter-module indirect branches (for which the source instructions are not available at compile time) may result in generation of endbranch instructions that do not include such parameters. Particular embodiments may substantially reduce vulnerability to malicious control flow transfers with relatively low performance overhead and design complexity.

Figure 2:
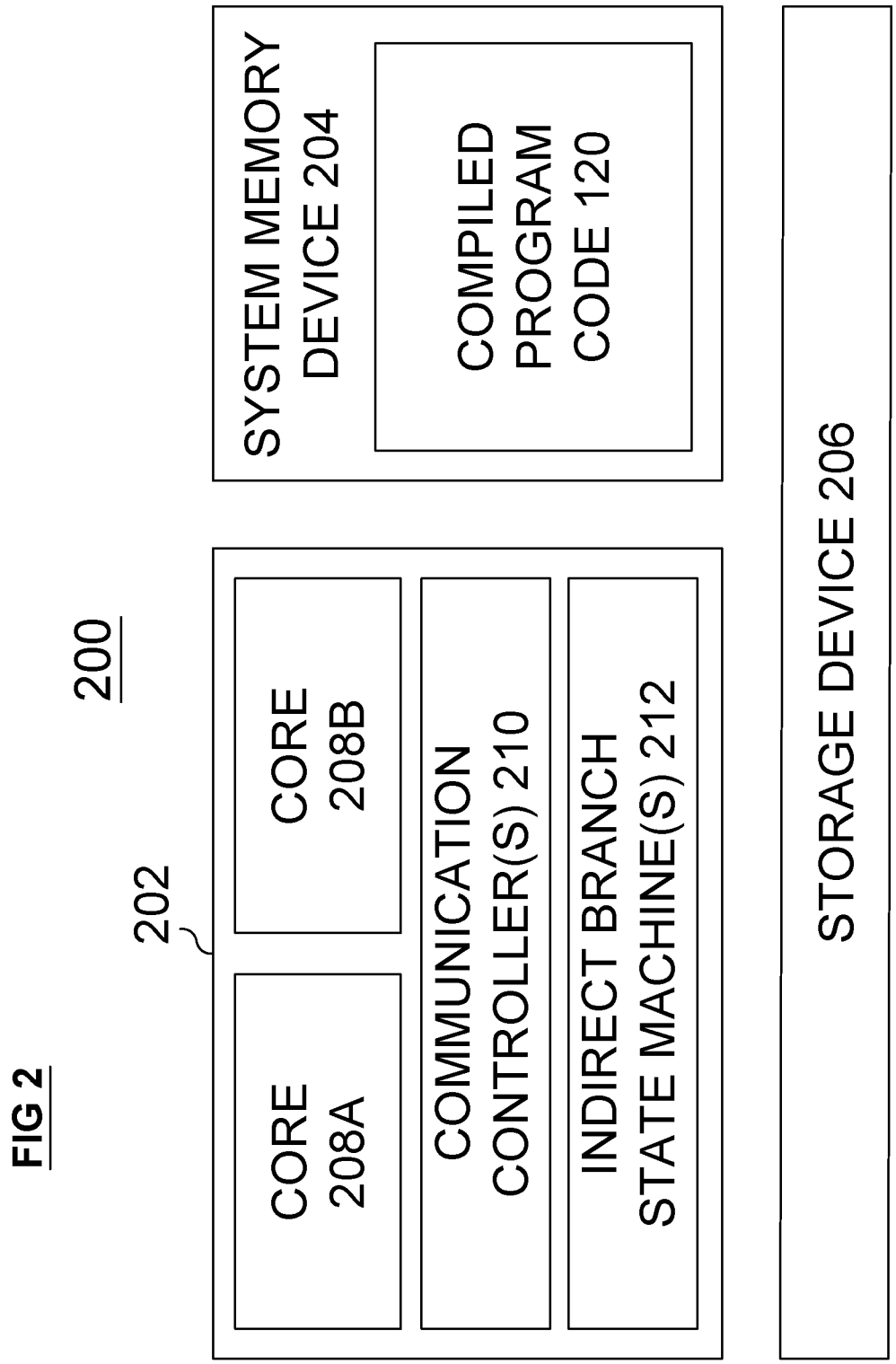
FIG. 2 illustrates a computer system to execute a compiled program in accordance with certain embodiments.

FIG. 2 illustrates a computer system 200 to execute a compiled program 120 in accordance with certain embodiments. In some embodiments, the computer system 200 that executes the compiled program code 120 may be the same computer system that compiled the program code, but in other embodiments, it may be a different computer system. System 200 includes a processor 202 comprising cores 208A and 208B, communication controller(s) 210, and indirect branch state machine(s) 212; system memory device 204, and storage device 206.

In operation, the compiled program code 120 may be loaded into the system memory device 204 (e.g., from storage device 206 or other source), and executed by one or more cores 208. Processor 202 may include a single indirect branch state machine 212 that is used by one or more cores 208 or multiple indirect branch state machines 212 (e.g., each core may be associated with its own state machine). An indirect branch state machine 212 is normally in an idle state during program execution. When an indirect branch instruction is encountered in during execution of compiled program code 120, The state machine 212 moves to a state in which it waits for an endbranch instruction. If the next instruction is not an endbranch instruction, the processor 202 may generate an error message. If the next instruction is an endbranch instruction allowing branches from external modules, the state machine moves back to the idle state. If instead the next instruction is an endbranch instruction indicating that only intra-module branches are allowed, the state machine 212 may check whether the one or more parameters indicate that the source instruction is part of the same module as the target endbranch instruction (or at least likely to be part of the same module). The processor 202 may generate an error message if the one or more parameters do not indicate that the source instruction and the target instruction are located in the same module or may allow program execution to continue otherwise.

Figure 3:
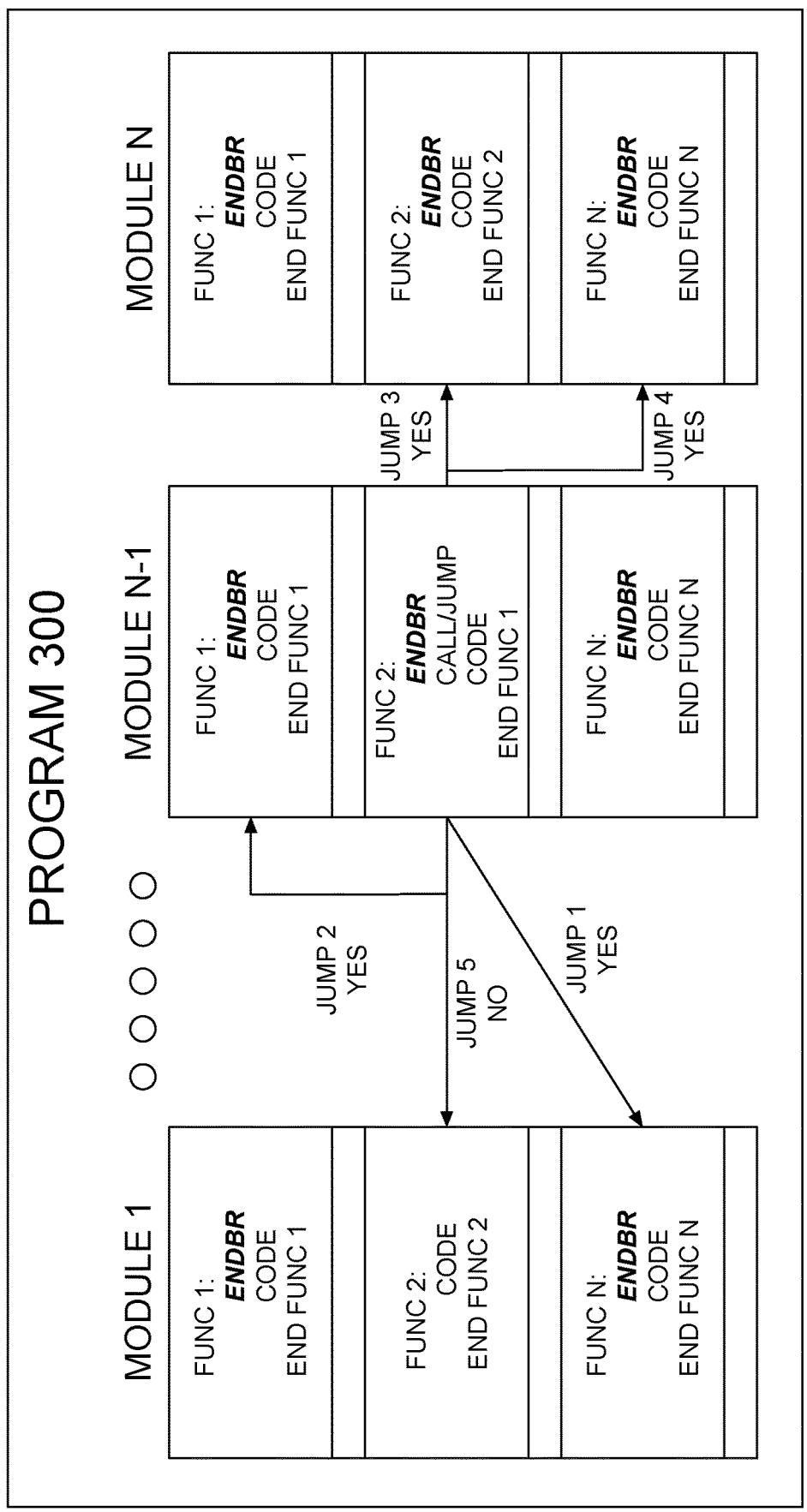
FIG. 3 illustrates a program comprising endbranch instructions in accordance with certain embodiments.

FIG. 3 illustrates a program 300 comprising standard endbranch instructions in accordance with certain embodiments. Program 300 includes a plurality of modules 302 (modules 1 through N, where N is any suitable integer) that each include one or more code blocks that each implement a function. The depicted functions of these modules are all valid targets of indirect branch instructions except for function 2 of module 1. Accordingly, each of these functions that is a valid target includes a standard endbranch instruction (ENDBR) (which may be inserted during the compiling of program 300). A standard endbranch instruction may allow indirect branches to the endbranch instruction from outside of the module or from within the module. In some embodiments, a standard endbranch instruction may include an opcode identifying the instruction as an endbranch instruction and may omit any parameters that allow determination of whether the source instruction and target instruction are part of the same module.

In the embodiment depicted, various indirect jumps from function 2 of module N-1 are depicted along with an indication of whether the jump is permissible. Because JUMPS 1-4 include endbranch instructions at their targets, these jumps are allowed. However, JUMP 5 does not include an endbranch instruction at its target and thus will result in the generation of an error message (e.g., a fault or exception). While programs that exclusively utilize standard endbranch instructions may provide protection against call/ jump oriented exploit programming, they may still be susceptible to a malicious gadget utilizing the valid targets to perform malicious operations since they allow indirect branches without respect to the relationship between the source instruction and the target instruction.

Figure 4:
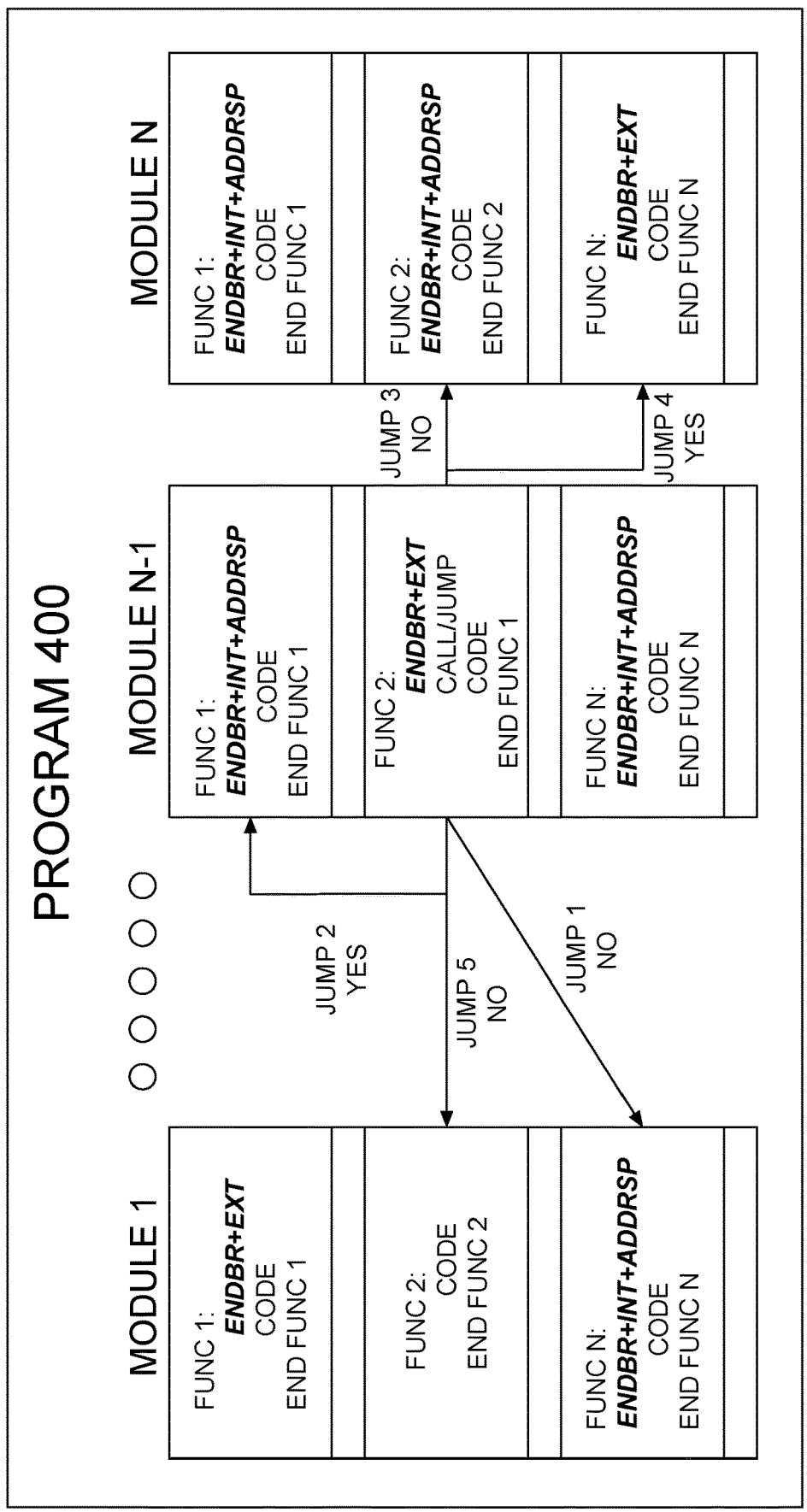
FIG. 4 illustrates a program comprising endbranch instructions each comprising parameters indicative of whether a source indirect branch instruction is allowed to branch to the endbranch instruction in accordance with certain embodiments.

FIG. 4 illustrates a program comprising endbranch instructions each comprising parameters indicative of whether a source indirect branch instruction is allowed to branch to the endbranch instruction in accordance with certain embodiments. By way of example, program 400 may be produced from the same source code as program 300, but may be compiled by a compiler that supports endbranch instructions comprising parameters indicative of whether a source indirect branch instruction is allowed to branch to the endbranch instruction. For example, the parameters may provide an indication allowing the processor 202 to determine whether the source indirect branch instruction is part of the same module as the target endbranch instruction.

In the embodiment depicted, each endbranch instruction includes an opcode (ENDBR) identifying the instruction as an endbranch instruction and a scope parameter (EXT or INT). A value of EXT (external) for the scope parameter indicates that inter-module branches to the endbranch instruction are allowed (e.g., the endbranch instruction may be branched to from instructions that are outside of the module or inside of the module), while a value of INT (internal) for the scope parameter indicates that only intra-module branches to the endbranch instruction are allowed (and thus branches to the endbranch instruction from outside of the module of the endbranch instruction are not allowed). The endbranch instructions that include a value of INT for the scope parameter also include information about the address space (ADDRSP) of the module of the endbranch instruction to allow a determination of whether the source indirect branch instruction is located within the address space of the module (an example of such a determination is described in FIG. 7). In a particular embodiment, the address space information includes a size of the module of the endbranch instruction. One example instruction format for such endbranch instructions is depicted in FIG. 5.

In contrast to program 300 of FIG. 3, function 2 in module N-1 may only access the internal targets within the same module (JUMP 2) and the externally exposed targets from other modules (JUMP 4). The jumps to internal targets in other modules (JUMP 1 and JUMP 3) are not allowed in this example, as function 2 of module N-1 is located in a different module than these targets.

Figure 5:
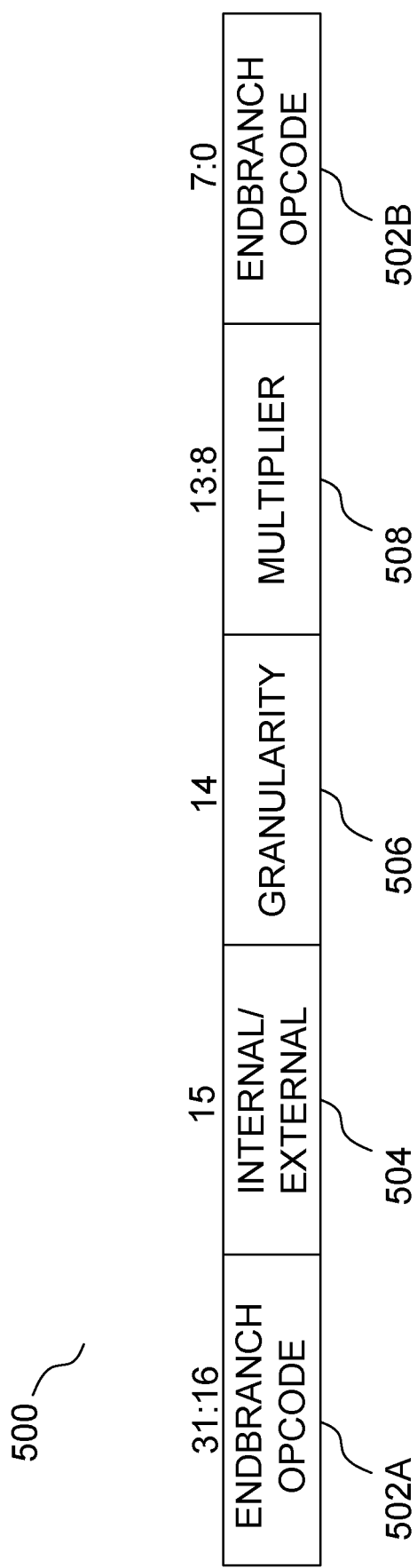
FIG. 5 illustrates an example endbranch instruction comprising a scope parameter, a granularity parameter, and a multiplier parameter in accordance with certain embodiments.

FIG. 5 illustrates an example endbranch instruction 500 comprising a scope parameter 504, a granularity parameter 506, and a multiplier parameter 508 in accordance with certain embodiments. The example endbranch instruction 500 occupies 4 bytes. Bits 31 through 16 comprise a first portion 502A of an opcode that identifies the instruction as an endbranch instruction and bits 7 through 0 comprise a second portion 502B of the opcode (in a particular embodiment, the second portion may be used to distinguish 32-bit and 64-bit mode for the processor 202, thus the additional parameters 504, 506, and 508 are included in the second to last byte instead of the last byte).

The scope parameter 504 indicates whether the endbranch instruction is internal only (i.e., whether a source indirect branch instruction targeting the endbranch instruction must be within the same module of the endbranch instruction or whether source indirect branch instructions may be outside of the module of the endbranch instruction). In a particular embodiment, the scope parameter 504 is a single bit and one value of the bit corresponds to internal only (i.e., intra-module branches only are allowed) while the other value of the bit corresponds to external (i.e., inter-module branches are allowed). In an alternate embodiment, the scope parameter may be omitted and different opcodes may be used for internal and external endbranch instructions.

The granularity parameter 506 may be used in conjunction with multiplier parameter 508 to indicate a size of the module in which the endbranch instruction is located. In the embodiment depicted, the granularity parameter 506 is a single bit (though in other embodiments it may be multiple bits). Each value of the granularity parameter may correspond to a particular granularity size (i.e., resolution). As just one example, if the granularity parameter 506 is set to 0, the granularity size is 4 KB, and if the granularity parameter 506 is set to 1, the granularity size is 256 KB. The product of the multiplier parameter 508 and the granularity size may indicate the size of the module. In the embodiment depicted, the multiplier is a 6-bit unsigned integer from 0 to 63. Thus, when the granularity size is 4 KB, the module size may be anywhere from 0 to 256 KB based on the value of the multiplier and when the granularity size is 256 KB, the module size may be anywhere from 256 KB to 128 MB. In alternative embodiments, the endbranch instruction may indicate the size of the module in any suitable manner. For example, the granularity parameter may be omitted and the instruction may simply include a binary value indicating the number of bytes in the module, a different number of bits may be used for the granularity parameter 506 and/or the multiplier 508, or the module size may be indicated in any suitable manner.

The embodiment depicted achieves a good balance between the resolution and range coverage of the module size. In the given example, a smaller module is represented more accurately with 4 KB granularity, while programs with larger modules (up to 128 MB per module) may still be covered with relatively good accuracy. The resolution and range may be configured differently in other embodiments based on user needs.

When the module size is known, the address of a source indirect branch instruction may be compared against the address of the target endbranch instruction and the module size in order to determine whether it is likely that the indirect branch instruction and endbranch instruction are located within the same module. Such a comparison is described in greater detail in connection with FIG. 7.

Figure 6:
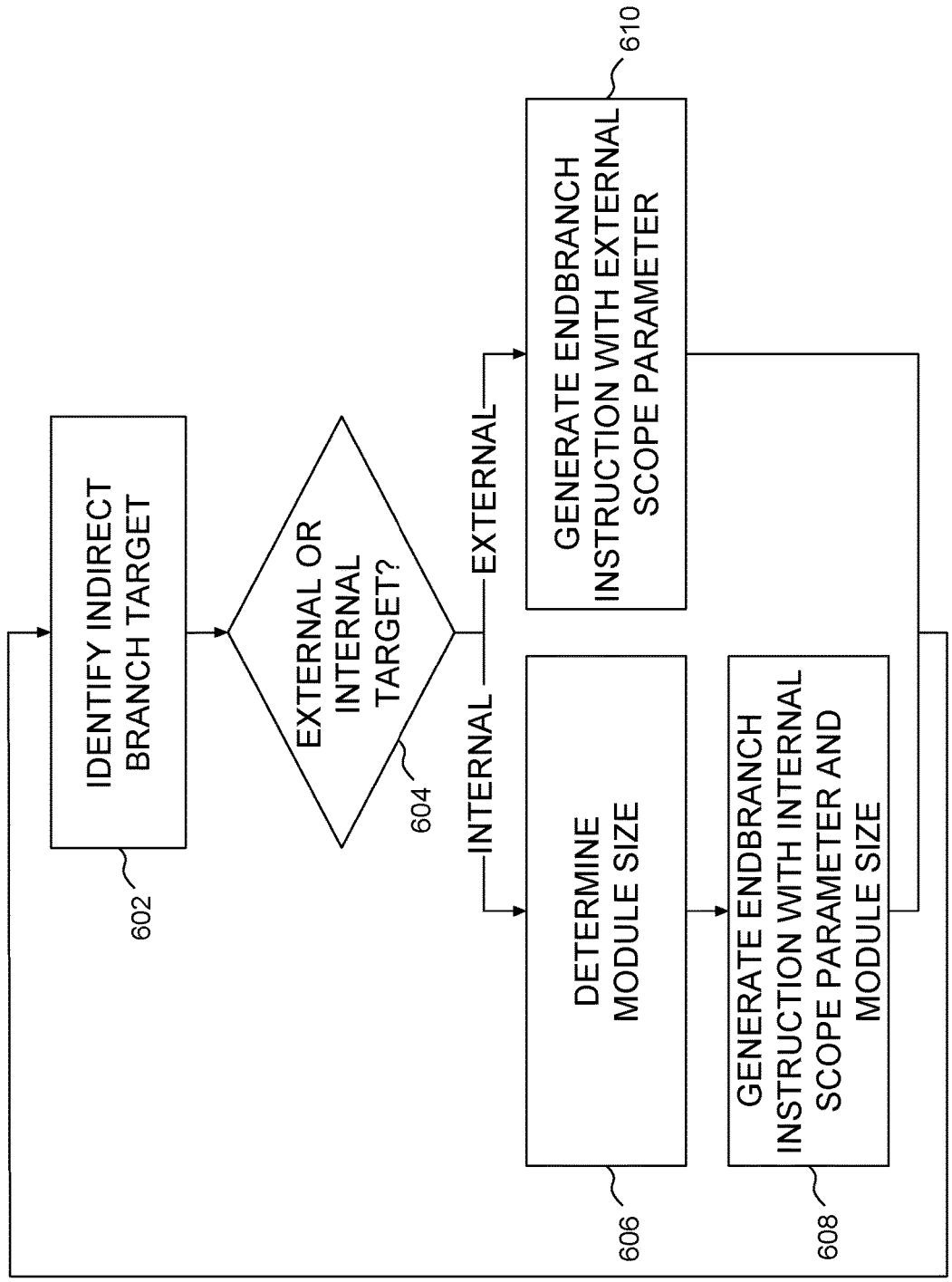
FIG. 6 illustrates a flow for compiling a program comprising endbranch instructions indicating module sizes in accordance with certain embodiments.

FIG. 6 illustrates a flow for compiling a program comprising endbranch instructions indicating module sizes in accordance with certain embodiments. The flow may be performed, e.g., by compiler 112 executed by processor 102 or other suitable logic.

At 602, an indirect branch target is identified during compiling of the program source code 118. At 604, a determination is made as to whether the target of the indirect branch is internal or external. For example, a determination may be made as to whether an indirect branch instruction is located within the same module as the target address of the indirect branch instruction. In various embodiments, all indirect branch instructions of the program that branch to the target may be analyzed to determine whether any of the indirect branch instructions are located outside of the module of the target address. If all of the one or more indirect branch instructions that target the same address are located in the same module as the target address, the target may be determined to be an internal target, otherwise the target may be determined to be an external target.

If the target is an internal target, a size of the module that includes the target is determined at 606. At 608, an endbranch instruction that includes a scope parameter with a value indicating that the target is an internal target and one or more parameters indicating the module size is generated. Alternatively, an endbranch instruction with an opcode that indicates that the target is an internal target and the size of the module may be generated. In one example, the parameters indicating the module size may include a granularity parameter and a multiplier (e.g., as illustrated in FIG. 5). In another example, the module size may be indicated by a binary value included in the endbranch instruction. The endbranch instruction may then be inserted in the compiled code as the target of the indirect branch instruction(s).

If the target is an external target, the size of the module does not need to be determined and an endbranch instruction that includes a scope parameter with a value indicating that the target is an external target is generated. Alternatively, an endbranch instruction with an opcode that indicates that the target is an external target may be generated. The endbranch instruction may then be inserted in the compiled code as the target of the indirect branch instruction(s). The flow may be repeated for additional indirect branch targets of the program.

Figure 7:
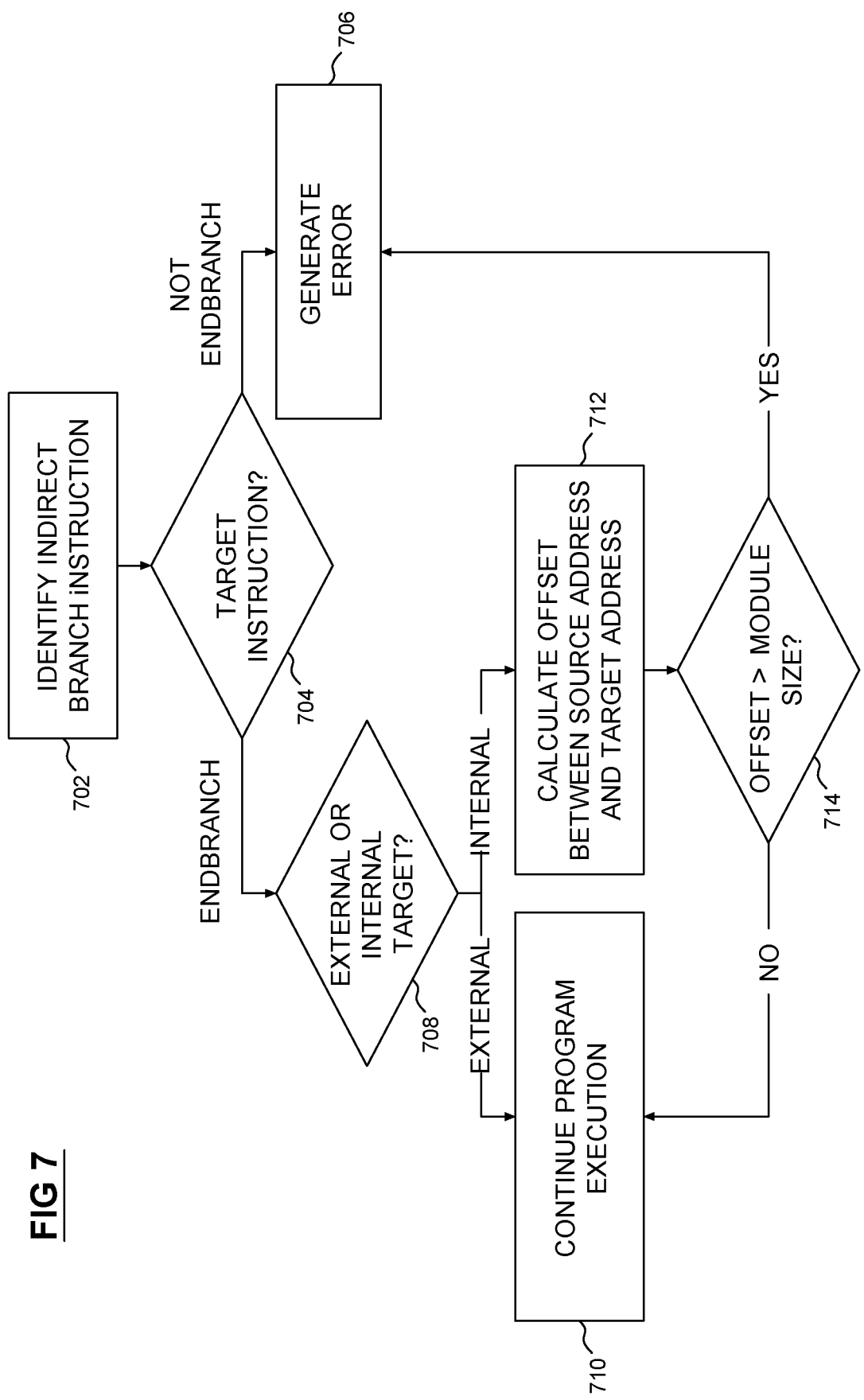
FIG. 7 illustrates a flow for executing a program comprising endbranch instructions indicating module sizes in accordance with certain embodiments.

FIG. 7 illustrates a flow for executing a program comprising endbranch instructions indicating module sizes in accordance with certain embodiments. The flow of FIG. 7 may be executed by, e.g., processor 202, or other suitable logic.

At 702 an indirect branch instruction is identified. For example, a processor may decode an indirect branch instruction. A target address of the indirect branch instruction may also be identified by accessing a memory location (e.g., register) specified by the indirect branch instruction and retrieving the target address.

At 704, the instruction at the target address is accessed and decoded to determine whether the target instruction is an endbranch instruction. If the target instruction is not an endbranch instruction, an error is generated at 706 and program execution terminates. If the target instruction is an endbranch instruction, the flow moves to 708 where a determination is made as to whether the target of the indirect branch instruction is an external or internal target. This determination may be made in any suitable manner. For example, the endbranch instruction may include a scope parameter that indicates whether the target is an external or internal target. As another example, the opcode of the endbranch instruction may indicate whether the target is an external or internal target.

If it is determined at 708 that the target is an external target, then program execution is continued at 710. If it is determined at 708 that the target is an internal target, then a verification process is performed to determine whether the indirect branch instruction is within the same module as the target. The endbranch instruction may include any suitable parameters allowing the processor to determine whether the endbranch instruction is within the same module as the indirect branch instruction. For example, in a particular embodiment (not depicted), the endbranch instruction may include an offset address from the memory address of the endbranch instruction to the beginning of the module and an offset address from the memory address of the endbranch instruction to the end of the module. The address range defined by these offsets (and the address of the endbranch instruction which may be obtained, e.g., from an instruction pointer register) may then be compared against the address of the indirect branch instruction (which may be obtained, e.g., from a register such as a last branch record register) to determine whether the instructions are located within the same module. As another example, in the embodiment depicted, an offset between a source address (i.e., the address of the indirect branch instruction) and a target address (i.e., the address of the endbranch instruction) is calculated at 712 (in a particular embodiment, the offset is an absolute value of a difference between the source address and the target address). At 714, this offset is compared against the module size specified by the endbranch instruction. If the offset is larger than the module size, then the indirect branch instruction is not within the same module as the endbranch instruction and an error is generated at 706. If the offset is smaller than the module size, then an assumption is made that the indirect branch instruction is within the same module as the endbranch instruction (in reality there is a negligible chance that it is not if the module of the indirect branch instruction is adjacent in memory to the module of the endbranch instruction) and the program execution is allowed to continue at 710.

Figure 8:
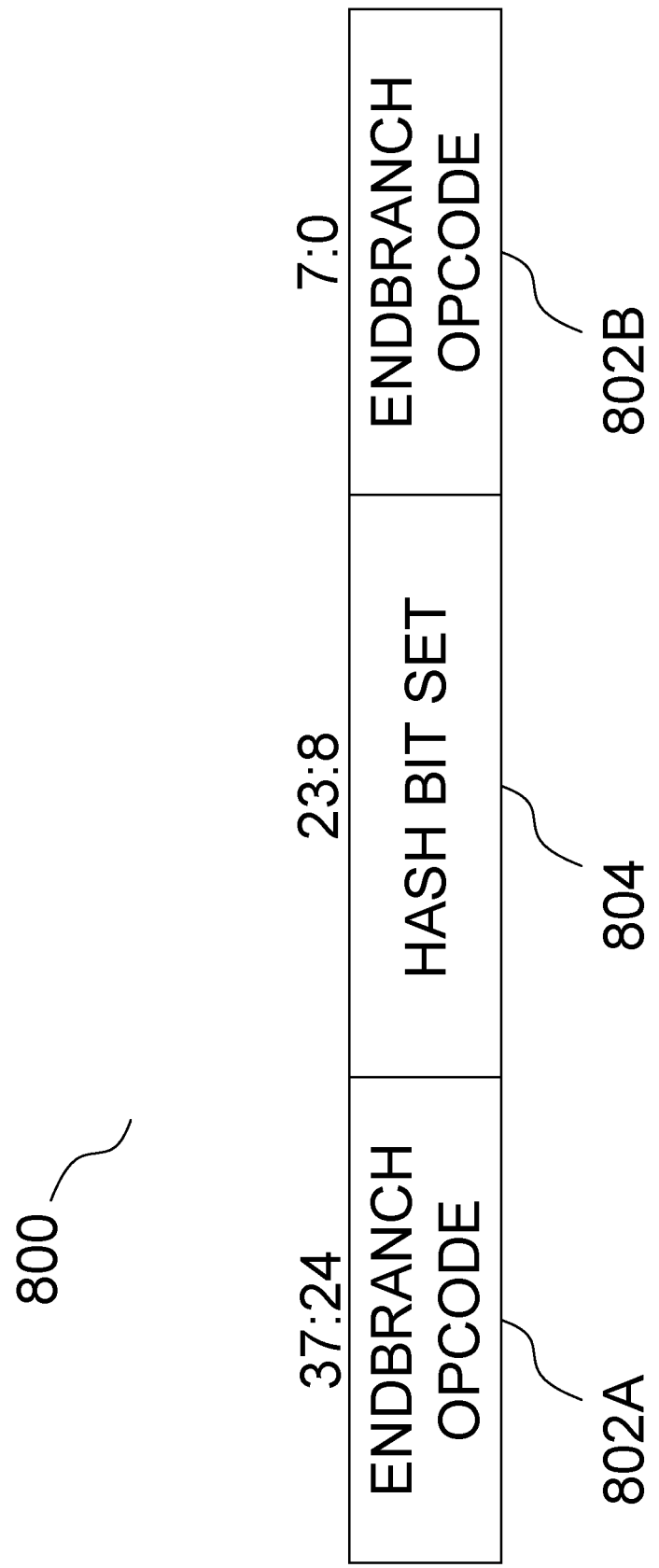
FIG. 8 illustrates an example endbranch instruction comprising a hash bit set in accordance with certain embodiments.

FIG. 8 illustrates an example endbranch instruction comprising a hash bit set 804 in accordance with certain embodiments. The example endbranch instruction 800 occupies 5 bytes. Bits 37 through 24 comprise a first portion 802A of an opcode that identifies the instruction as an endbranch instruction and bits 7 through 0 comprise a second portion 502B of the opcode (in a particular embodiment, the second portion may be used to distinguish 32-bit and 64-bit mode for the processor 202, thus the hash bit set 804 are not included in the last byte). In various embodiments, the hash bit set and opcode may occupy any number of bits in any suitable location of the endbranch instruction.

The bits of the hash bit set are set at compile time to identify the valid source instructions (e.g., indirect branch instructions) that have permission to jump to the endbranch instruction. The number of bits in the hash bit set may be configurable depending on the selected hash value size. Larger hash value sizes benefit from lower collision rates, but require more bits in the hash bit set. In a particular embodiment, the hash value size is 4 bits. With a 4-bit hash size, hash value ranges from 0 to 15, and 16 bits are used in the hash bit set to represent all possible hash values.

During compile time, the bits of hash bit set 804 may each be initialized to a reset value. When a branch target is identified, a valid source instruction for the branch target is hashed (e.g., a binary representation of the opcode and any parameters included in the instruction may be hashed) to generate a hash value and the bit of the hash bit set 804 that corresponds to the hash value is set. This operation may be repeated for each valid source instruction for the particular branch target. The resulting endbranch instruction is inserted into the compiled program code 120.

At run time, when an indirect branch instruction is encountered, an indirect branch state machine 212 may go from an idle state to a wait_for_endbranch state. If a standard endbranch instruction (e.g., an endbranch instruction without the hash bit set and/or an endbranch instruction configured to allow external branches) is detected, the state machine 212 returns to the idle state and program execution is allowed to continue. However, if an endbranch instruction with a hash bit set is detected, instead of going back to the idle state immediately and allowing the control flow transfer, the state machine goes to a check_source_hash state. The processor 202 then calculates a hash value by hashing the source instruction and determines whether the hash value's corresponding bit in hash bit set 804 is set. If the bit is set, the processor 202 allows the control flow transfer and the state machine 212 goes back to the idle state, otherwise, the processor generates an error message.

As an example, compiled code of a program may include the functions "main", "foo1", "foo2", "bar1", and "bar2":

```
1: <main>:
2: endbranch+hashbitset
3: push % rbp
4: mov % rsp,% rbp
5: sub $0x10, % rsp
6: movq $bar1, −8(% rbp)
```

```
7: mov -8(% rbp), % rdx
8: mov $0x0, % eax
9: call % rdx
10: leaveq
11: retq
12: <foo1>:
13: endbr64+hashbitset
14: push % rbp
15: mov % rsp,% rbp
16: sub $0x10, % rsp
17: movq $bar1, -8(% rbp)
18: call -8(% rbp)
19: leaveq
20: retq
21: <foo2>:
22: endbr64+hashbitset
23: push % rbp
24: mov % rsp,% rbp
25: sub $0x10, % rsp
26: movq $bar2, -8(% rbp)
27: mov -8(% rbp), % rdx
28: jmp % rdx
29: leaveq
30: retq
31: <bar1>:
32: endbr64+hashbitset
33: push % rbp
34: mov % rsp,% rbp
35: leaveq
36: retq
31: <bar2>:
32: endbr64+hashbitset
33: push % rbp
34: mov % rsp,% rbp
35: leaveq
36: retq
```

For purposes of explanation, an assumption is made that the indirect branch instructions ("call % rdx" and "call -8(% rbp)") of <main> and <foo1> can call to <bar1>, while the indirect branch instruction (jmp % rdx) in <foo2> is not supposed to jump to <bar1>. In this case, the hash bit set 804 in the endbranch instruction of <bar1> should only have the bits corresponding to the hash values of the source instructions "call % rdx" in <main> and "call -8(% rbp)" in <foo1> set as valid.

The following example, assumes 4-bit hash values and a simple data compression hash function that adds up all the is in the instruction code and performs a modulo 16 operation on the sum to generate the hash value, though in other embodiments any suitable hash function and hash value lengths may be used. In one embodiment, the instruction "call % rdx" has a binary value of 0xffd2, resulting in a hash value of 12, and the instruction "call -8(% rbp)" has a binary value of 0xff55f8, resulting in a hash value of 1. Assuming these are the only valid indirect branches to the endbranch instruction in <bar1>, the hash bit set 804 of this endbranch instruction is set to 0x1002 such that only the 1st and 12th bits are set to one. During runtime, if the indirect jmp instruction in <foo2> tries to jump to <bar1>, its source instruction "jmp % rdx" with a binary value of 0xffe3 and a hash value of 13 will fail the hash check because the 13th bit in the parameter is 0.

Figure 9:
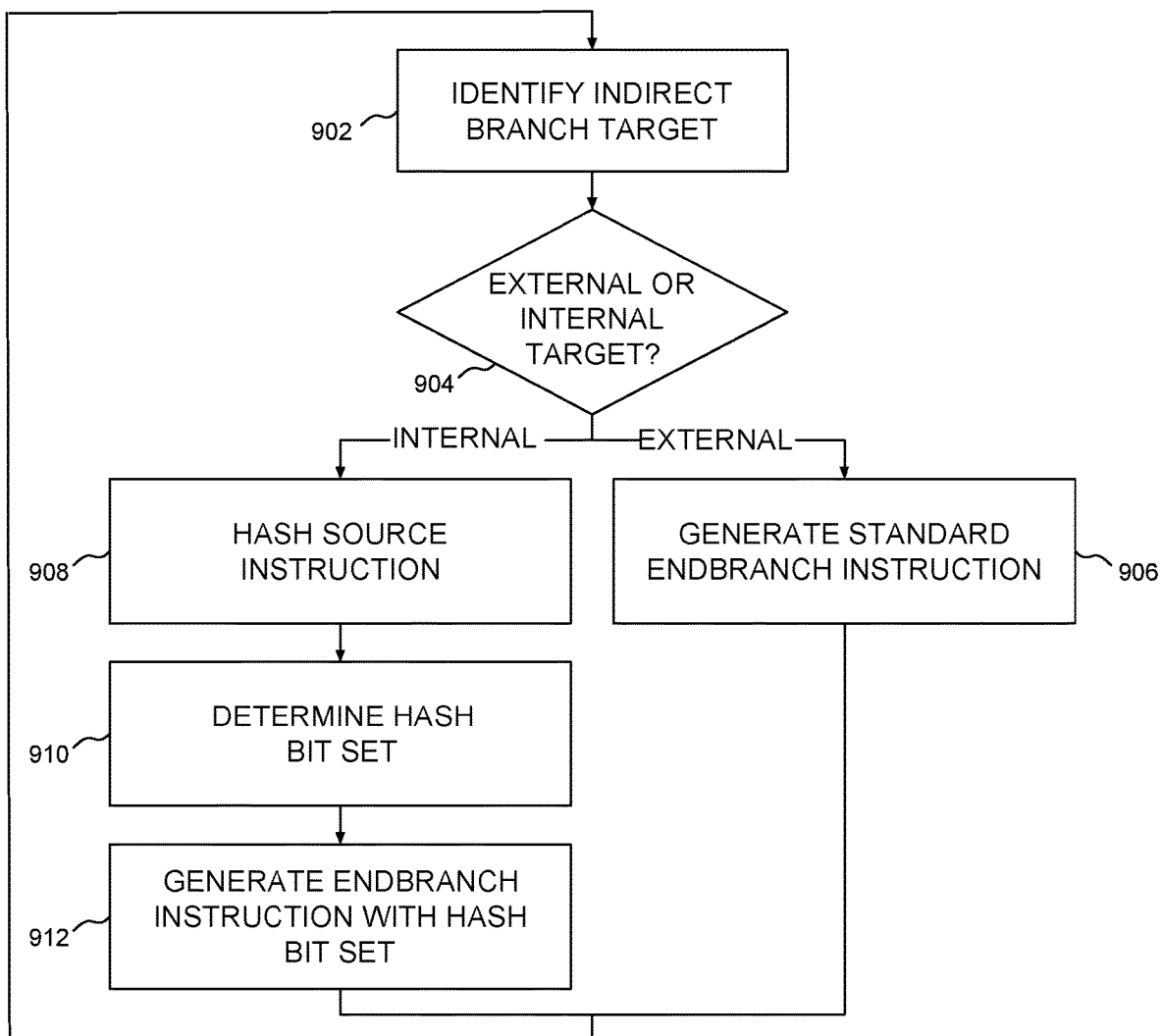
FIG. 9 illustrates a flow for compiling a program comprising endbranch instructions with hash bit sets in accordance with certain embodiments.

FIG. 9 illustrates a flow for compiling a program comprising endbranch instructions with hash bit sets in accordance with certain embodiments. The flow may be performed, e.g., by compiler 112 executed by processor 102 or other suitable logic.

At 902, a target of an indirect branch is identified during compiling of the program source code 118. At 904, a determination is made as to whether the target is internal or external. In various embodiments, all indirect branch instructions of the program that branch to the target may be analyzed to determine whether any of the indirect branch instructions are located outside of the module of the target address. If all of the one or more indirect branch instructions that target the same address are located in the same module as the target address, the target may be determined to be an internal target, otherwise the target may be determined to be an external target.

If the target is an external target, a standard endbranch instruction may be generated and inserted into the compiled program code 120. If the target is an internal target, then an instruction that indirectly branches to the target is hashed at 908 and a bit of hash bit set 804 that corresponds to the resulting hash value is set at 910. The hash operation at 908 and the set operation at 910 may be repeated for each instruction that indirectly branches to the target. At 912, an endbranch instruction with the hash bit set is generated and inserted into the compiled program code 120. The flow may be repeated for additional indirect branch targets of the program.

FIG. 10 illustrates a flow for executing a program comprising endbranch instructions with hash bit sets in accordance with certain embodiments. The flow of FIG. 10 may be executed by, e.g., processor 202, or other suitable logic.

At 1000 an indirect branch instruction is identified. For example, a processor may decode an indirect branch instruction. A target address of the indirect branch instruction may also be identified by accessing a memory location (e.g., register) specified by the indirect branch instruction and retrieving the target address.

At 1002, the instruction at the target address is accessed and decoded to determine the type of the target instruction. If the target instruction is not an endbranch instruction, an error is generated at 1004 and program execution terminates. If the target instruction is a standard endbranch instruction (e.g., an endbranch instruction that allows indirect branches from any instruction of the program), the flow moves to 1006 where the branch is allowed and program execution continues.

If the target instruction is an endbranch instruction with a hash bit set, the flow moves to 1008 where a hash value of the indirect branch instruction is calculated. At 1010 it is determined whether a bit that corresponds to the calculated hash value is set in the hash bit set of the endbranch instruction. If the corresponding bit is not set, the flow moves to 1004 where an error message is generated. If the corresponding bit is set, the branch is allowed and program execution continues at 1006.

Some of the blocks illustrated in FIGS. 6-7 and 9-10 may be repeated, combined, modified or deleted where appropriate, and additional blocks may also be added to the flowchart. Additionally, blocks may be performed in any suitable order without departing from the scope of particular embodiments.

The figures below detail exemplary architectures and systems to implement embodiments of the above. For example, any of the processors described below may be used to execute compiler 112 or to executed compiled program code 120. As another example, any of the computer systems described below may be used to implement computer system 100 or 200. In some embodiments, one or more hardware components and/or instructions described above are emulated as detailed below, or implemented as software modules.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 11A is a block diagram illustrating both an exemplary in-order pipeline and an exemplary register renaming, out-of-order issue/execution pipeline according to embodiments of the disclosure. FIG. 11B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression and/or decompression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 12B:
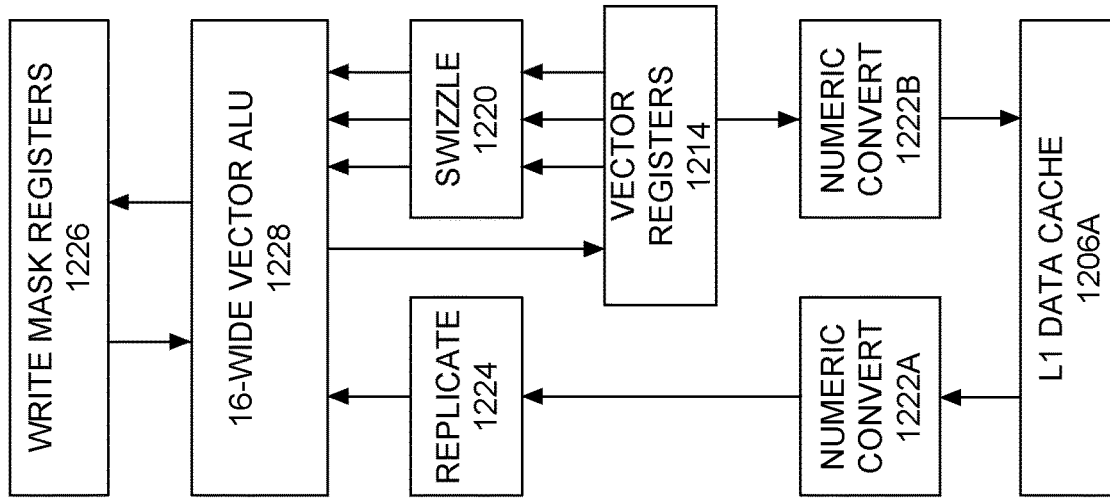
FIGS. 12A-B illustrate a block diagram of a more specific exemplary in-order core architecture, which core would be one of several logic blocks (potentially including other cores of the same type and/or different types) in a chip in accordance with certain embodiments.
Figure 12A:
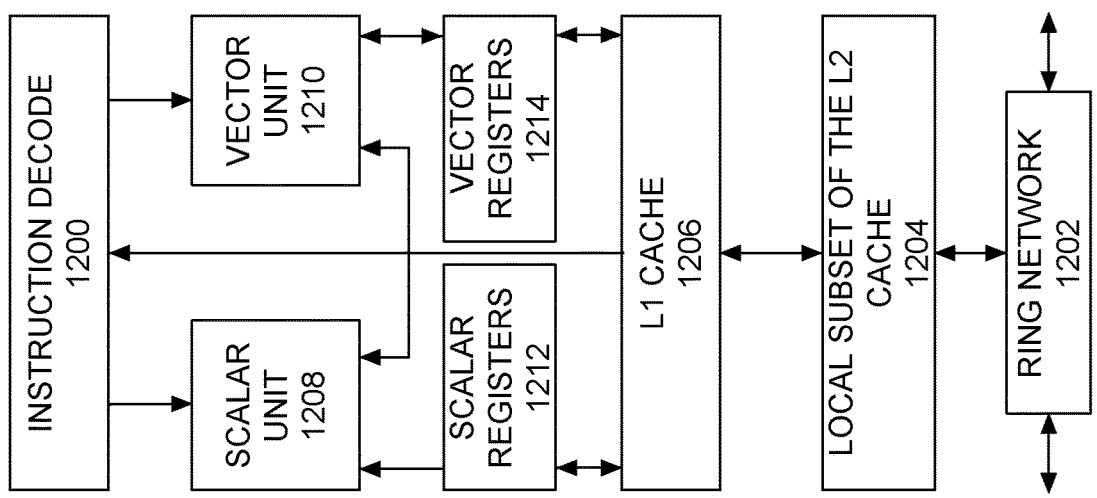

FIGS. 12A-B illustrate a block diagram of a more specific exemplary in-order core architecture, which core would be one of several logic blocks (potentially including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to various embodiments. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments may use a different approach (e.g., use a single register set or include a communication path that allow data to be transferred between the two register files without being written and read back).

The local subset of the L2 cache 1204 is part of a global L2 cache that is divided into separate local subsets (in some embodiments one per processor core). Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. In a particular embodiment, each ring data-path is 1012-bits wide per direction.

FIG. 12B is an expanded view of part of the processor core in FIG. 12A according to embodiments. FIG. 12B includes an L1 data cache 1206A (part of the L1 cache 1206), as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
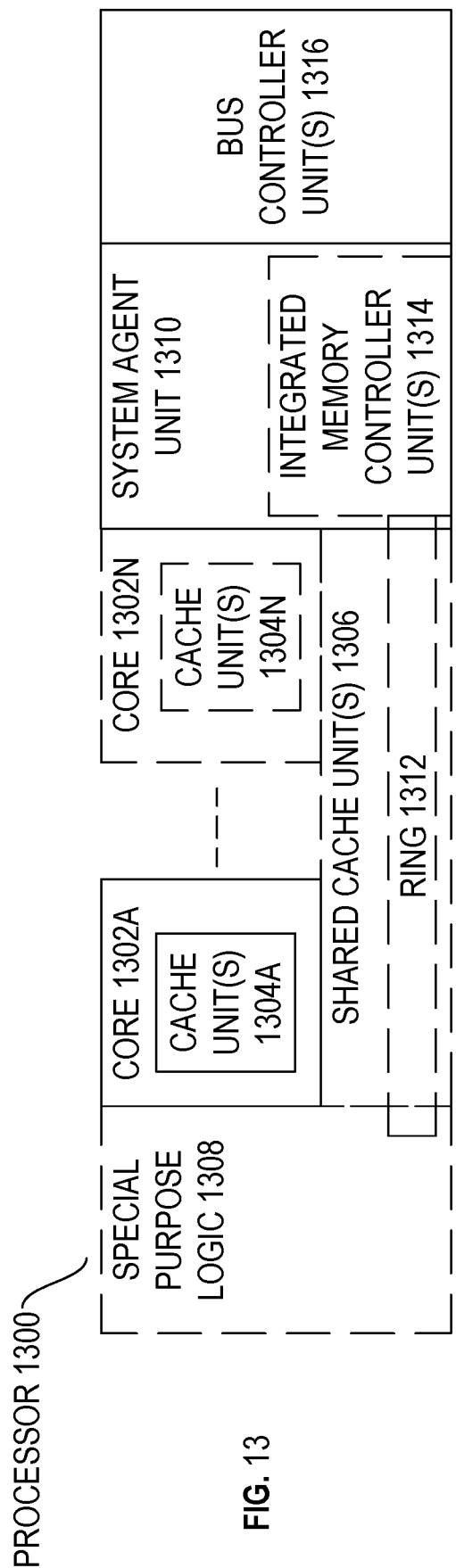
FIG. 13 is a block diagram of a processor that may have more than one core, may have an integrated memory controller, and may have integrated graphics in accordance with certain embodiments.

FIG. 13 is a block diagram of a processor 1300 that may have more than one core, may have an integrated memory controller, and may have integrated graphics according to various embodiments. The solid lined boxes in FIG. 13 illustrate a processor 1300 with a single core 1302A, a system agent 1310, and a set of one or more bus controller units 1316; while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, or a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression and/or decompression engine, graphics processor, GPGPU (general purpose graphics processing unit), a high-throughput many integrated core (MIC) coprocessor (e.g., including 30 or more cores), embedded processor, or other fixed or configurable logic that performs logical operations. The processor may be implemented on one or more chips. The processor 1300 may be a part of and/or may be implemented on one or more substrates using any of a number of process technologies, such as, for example, BiCMOS, CMOS, or NMOS.

In various embodiments, a processor may include any number of processing elements that may be symmetric or asymmetric. In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the special purpose logic (e.g., integrated graphics logic) 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302A-N.

In some embodiments, one or more of the cores 1302A-N are capable of multi-threading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the special purpose logic 1308. The display unit is for driving one or more externally connected displays.

The cores 1302A-N may be homogenous or heterogeneous in terms of architecture instruction set; that is, two or more of the cores 1302A-N may be capable of executing the same instruction set, while others may be capable of executing only a subset of that instruction set or a different instruction set.

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable for performing the methods described in this disclosure. In general, a huge variety of systems or electronic devices capable of incorporating a processor and/or other execution logic as disclosed herein are generally suitable.

Figure 14:
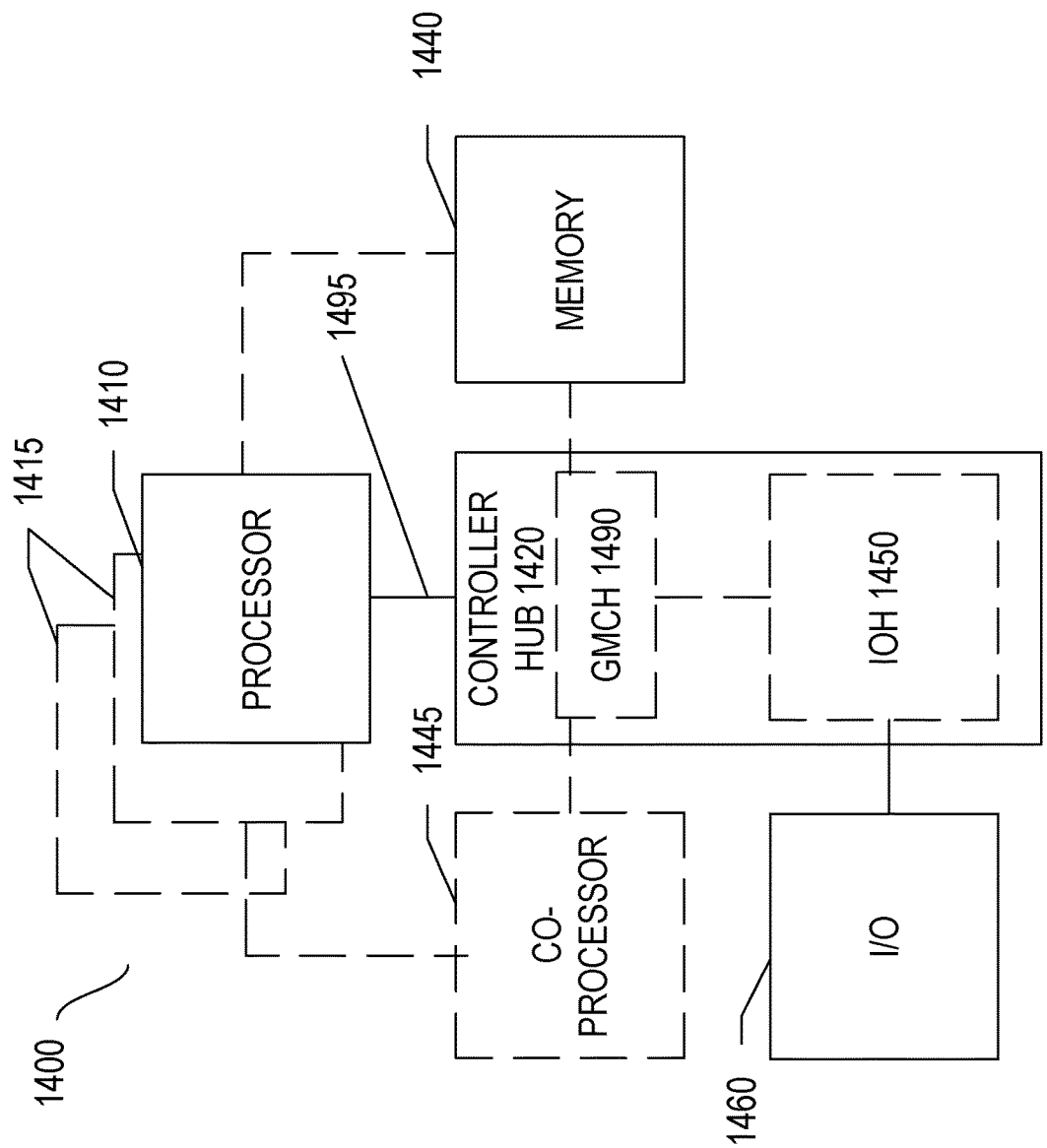
FIGS. 14, 15, 16, and 17 are block diagrams of exemplary computer architectures in accordance with certain embodiments.

FIG. 14 depicts a block diagram of a system 1400 in accordance with one embodiment of the present disclosure. The system 1400 may include one or more processors 1410, 1415, which are coupled to a controller hub 1420. In one embodiment, the controller hub 1420 includes a graphics memory controller hub (GMCH) 1490 and an Input/Output Hub (IOH) 1450 (which may be on separate chips or the same chip); the GMCH 1490 includes memory and graphics controllers coupled to memory 1440 and a coprocessor 1445; the IOH 1450 couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 is a single chip comprising the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), other suitable memory, or any combination thereof. The memory 1440 may store any suitable data, such as data used by processors 1410, 1415 to provide the functionality of computer system 1400. For example, data associated with programs that are executed or files accessed by processors 1410, 1415 may be stored in memory 1440. In various embodiments, memory 1440 may store data and/or sequences of instructions that are used or executed by processors 1410, 1415.

In at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression and/or decompression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
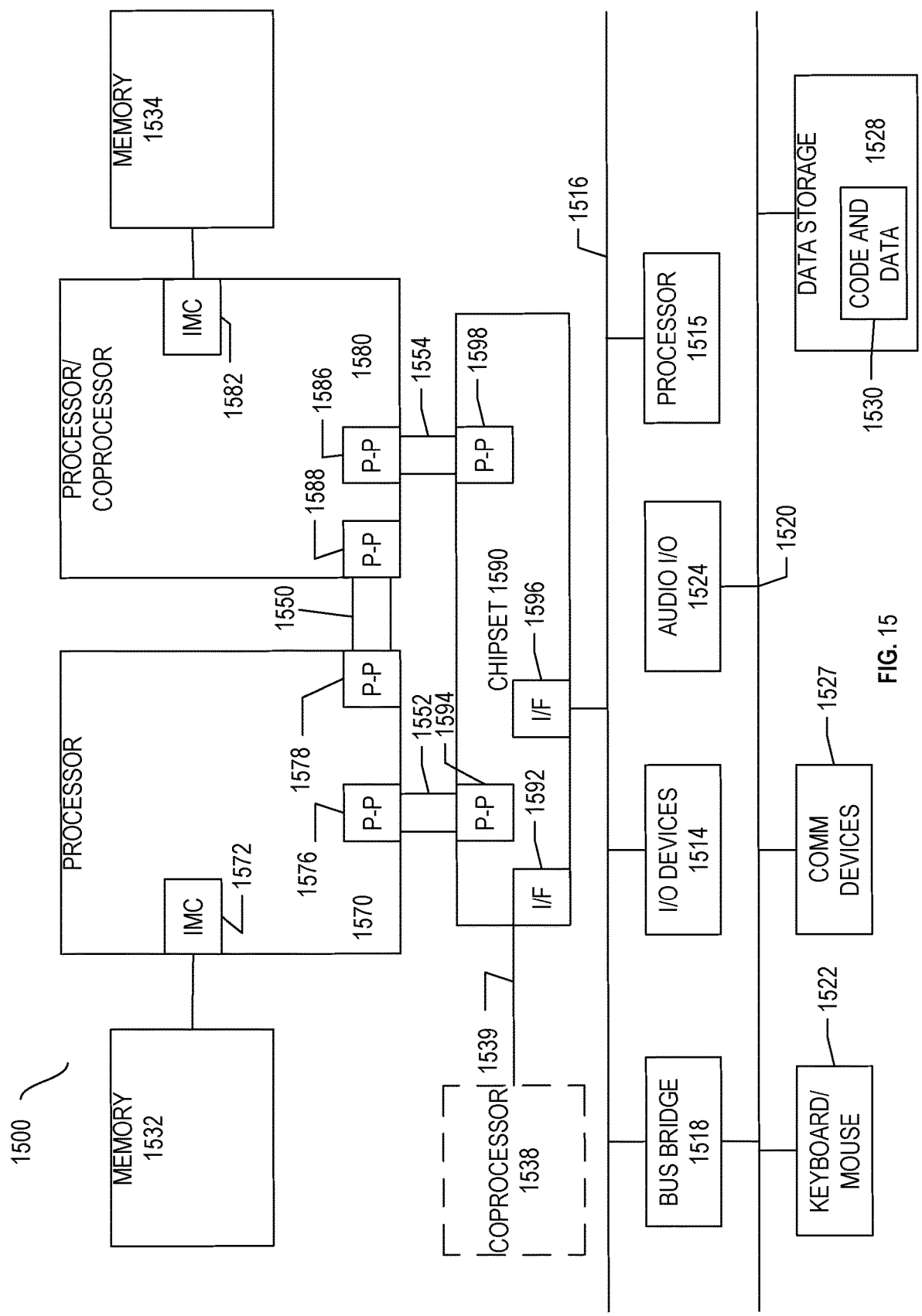

FIG. 15 depicts a block diagram of a first more specific exemplary system 1500 in accordance with an embodiment of the present disclosure. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the disclosure, processors 1570 and 1580 are respectively processors 1410 and 1415, while coprocessor 1538 is coprocessor 1445. In another embodiment, processors 1570 and 1580 are respectively processor 1410 and coprocessor 1445.

Processors 1570 and 1580 are shown including integrated memory controller (IMC) units 1572 and 1582, respectively. Processor 1570 also includes as part of its bus controller unit's point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression and/or decompression engine, graphics processor, GPGPU, embedded processor, or the like.

A shared cache (not shown) may be included in either processor or outside of both processors, yet connected with the processors via a P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present disclosure is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are contemplated by this disclosure. For example, instead of the point-to-point architecture of FIG. 15, a system may implement a multi-drop bus or other such architecture.

Figure 16:
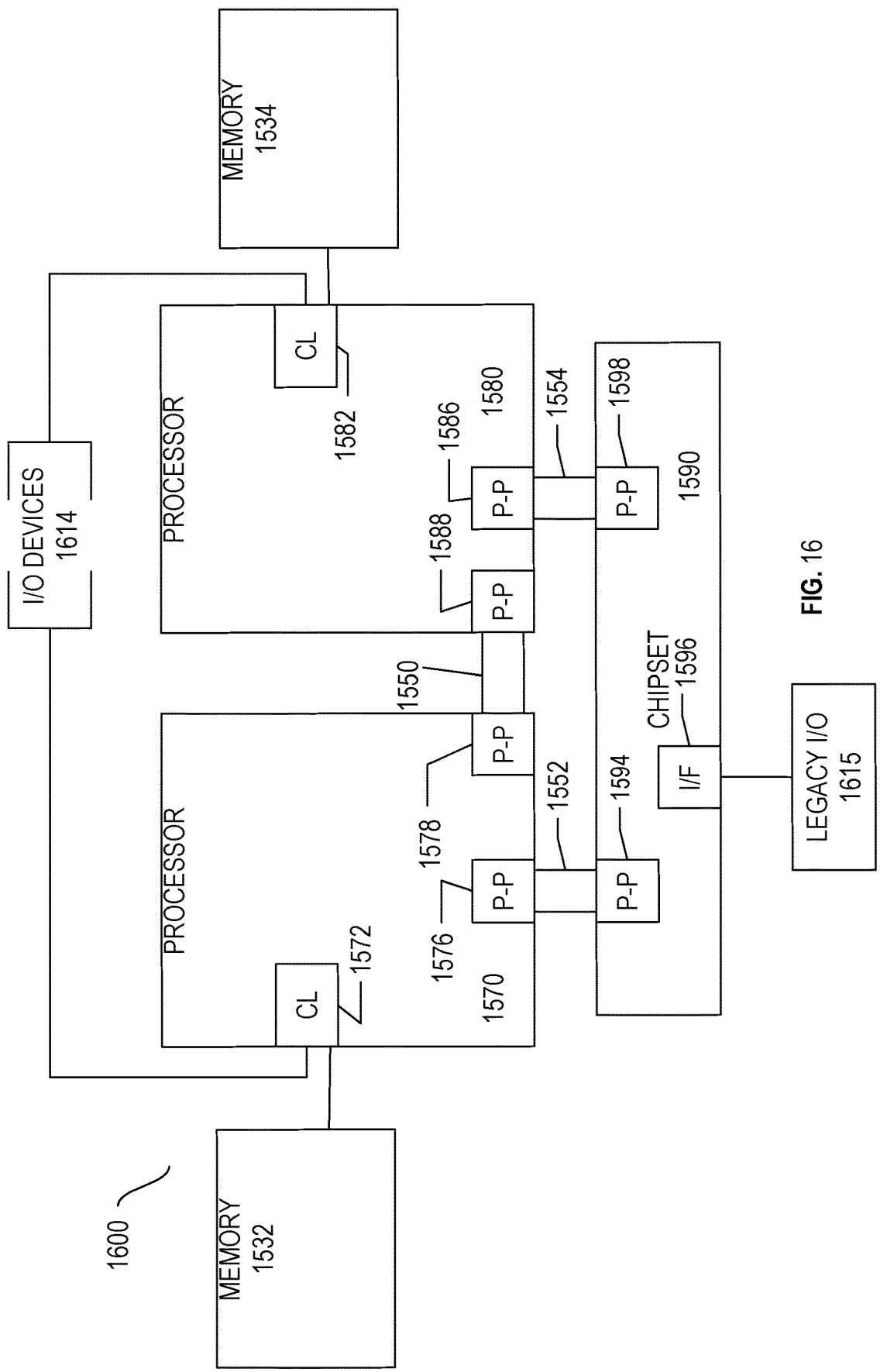

FIG. 16 depicts a block diagram of a second more specific exemplary system 1600 in accordance with an embodiment of the present disclosure. Similar elements in FIGS. 15 and 16 bear similar reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
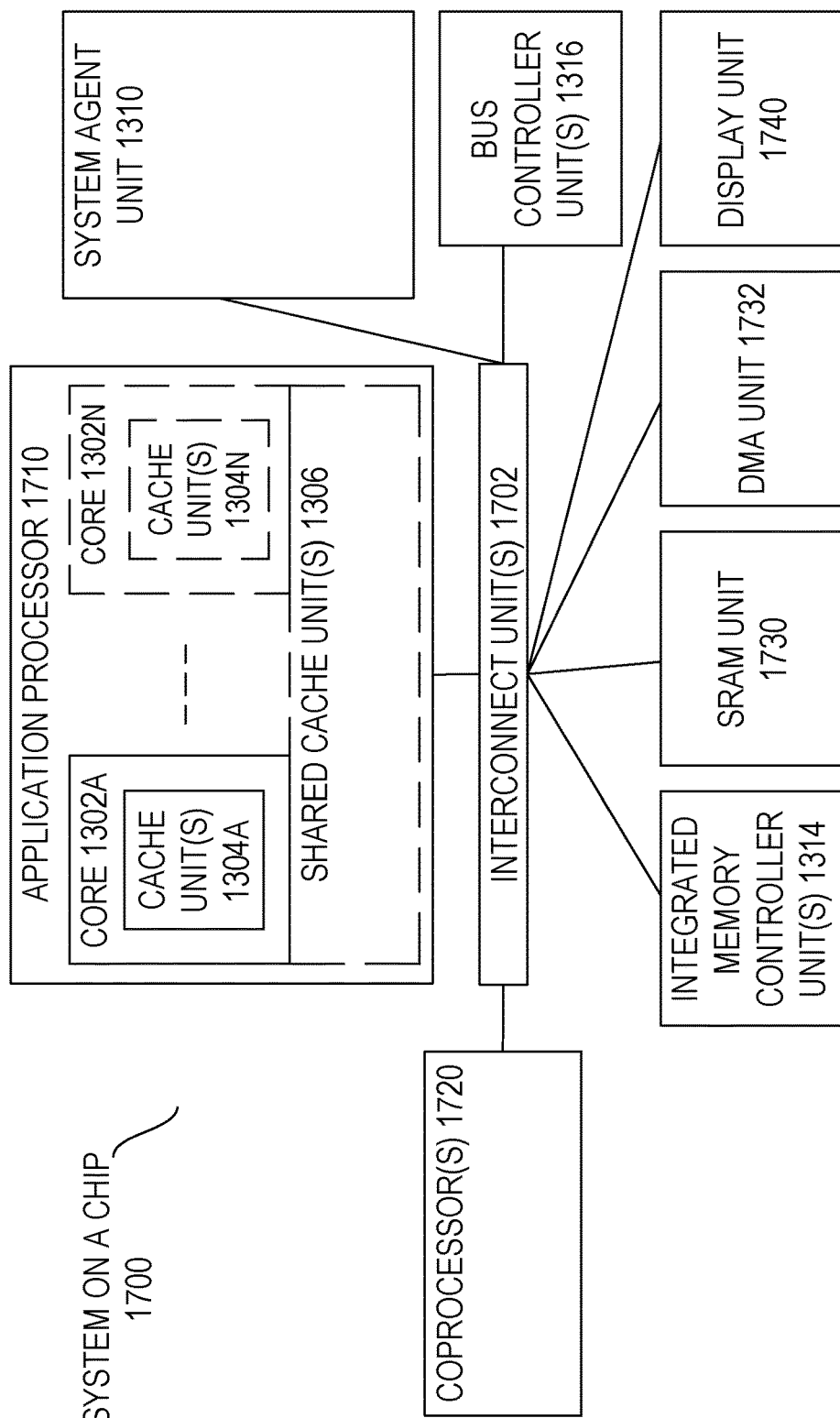

FIG. 17 depicts a block diagram of a SoC 1700 in accordance with an embodiment of the present disclosure. Similar elements in FIG. 13 bear similar reference numerals. Also, dashed lined boxes are optional features on more advanced SoCs. In FIG. 17, an interconnect unit(s) 1702 is coupled to: an application processor 1710 which includes a set of one or more cores 1302A-N and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression and/or decompression engine, GPGPU, a high-throughput MIC processor, embedded processor, or the like.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
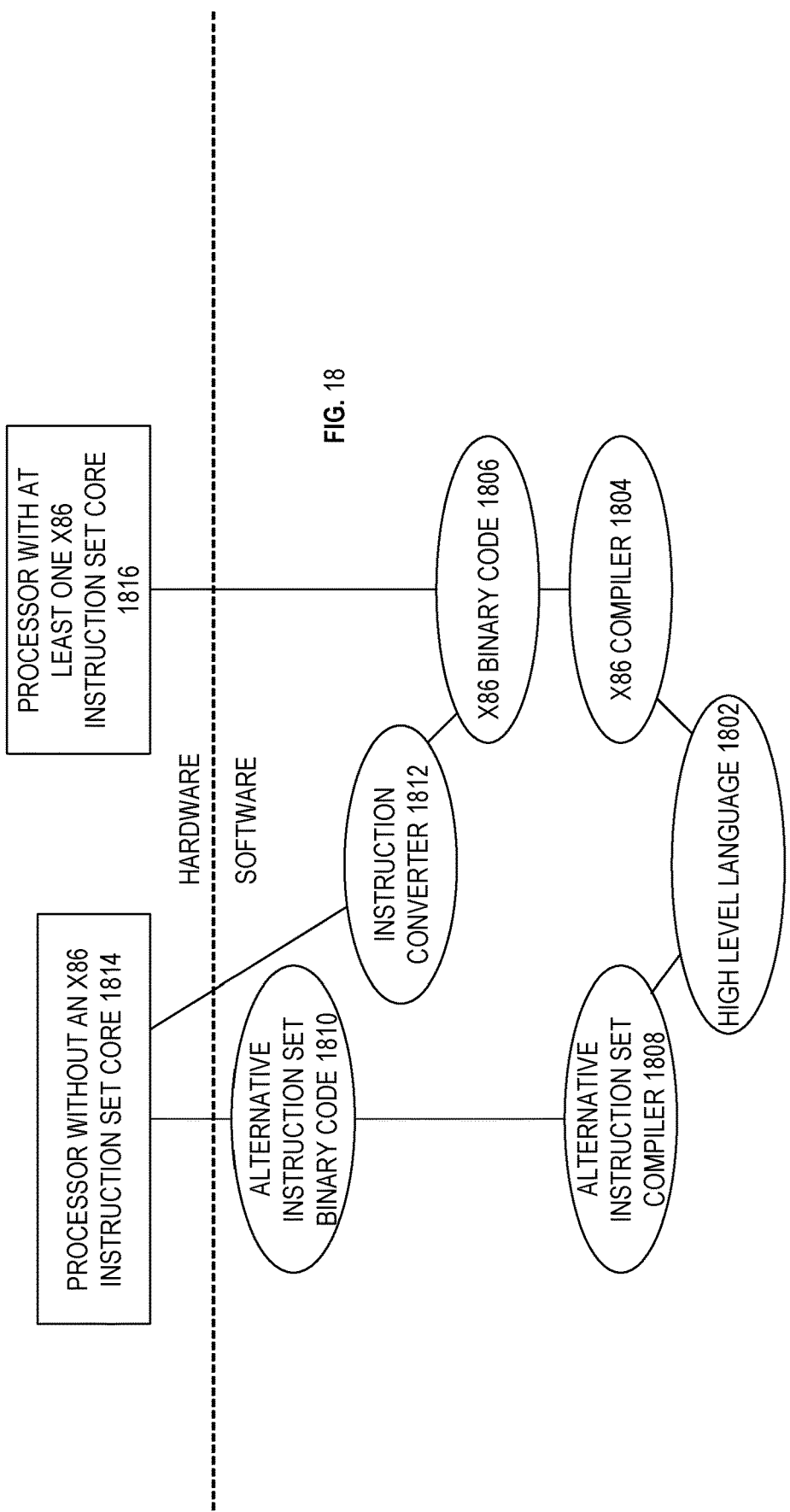
FIG. 18 is a block diagram contrasting the use of a software instruction converter to convert binary instructions in a source instruction set to binary instructions in a target instruction set in accordance with certain embodiments.

FIG. 18 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the functionality of the various components such as processor 102, compiler 112, indirect branch detector 114, endbranch instruction generator 116, processor 202, indirect branch state machine 212, other component described herein, or any subcomponent of any of these components. "Logic" may refer to hardware, firmware, software and/or combinations of each to perform one or more functions. As an example, logic may include hardware, such as a micro-controller or processor, associated with a non-transitory medium to store code adapted to be executed by the micro-controller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the micro-controller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, hardware, and/or element designed in such a way to enable use of the apparatus, hardware, and/or element in a specified manner. Note as above that use of to, capable to, or operable to, in one embodiment, refers to the latent state of an apparatus, hardware, and/or element, where the apparatus, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

In at least one embodiment, a processor comprises a decoder to decode a first instruction, the first instruction comprising an opcode and at least one parameter, the opcode to identify the first instruction as an instruction associated with an indirect branch, the at least one parameter indicative of whether the indirect branch is allowed; and circuitry to generate an error message based on the at least one parameter.

In an embodiment, the at least one parameter indicates a size of an address range. In an embodiment, the circuitry is to determine an offset between an address of a second instruction to specify the indirect branch and an address of the first instruction; and generate the error message if the offset is larger than the size of the address range. In an embodiment, the at least one parameter comprises a multiplier and a granularity bit, wherein the size of the address range is the product of the multiplier and a granularity size, the granularity size corresponding to a value of the granularity bit. In an embodiment, the first instruction further comprises a binary indicator to specify a scope of allowed indirect branches. In an embodiment, the at least one parameter comprises a set of bits that each correspond to a hash value. In an embodiment, the circuitry is to hash a second instruction to generate a first hash value; determine a bit of the at least one parameter, the bit to correspond to the first hash value; and generate the error message based on a value of the bit. In an embodiment, the processor is communicatively coupled to at least one of a battery, a display, or a network interface.

In at least one embodiment, a method comprises decoding a first instruction, the first instruction comprising an opcode and at least one parameter, the opcode to identify the first instruction as an instruction associated with an indirect branch, the at least one parameter indicative of whether the indirect branch is allowed; and generating an error message based on the at least one parameter.

In an embodiment, the at least one parameter indicates a size of an address range. In an embodiment, the method further comprises determining an offset between an address of a second instruction to specify the indirect branch and an address of the first instruction; and generating the error message if the offset is larger than the size of the address range. In an embodiment, the at least one parameter comprises a multiplier and a granularity bit, wherein the size of the address range is the product of the multiplier and a granularity size, the granularity size corresponding to a value of the granularity bit. In an embodiment, the first instruction further comprises a binary indicator to specify a scope of allowed indirect branches. In an embodiment, the at least one parameter comprises a set of bits that each correspond to a hash value. In an embodiment, the method further comprises hashing a second instruction to generate a first hash value; determining a bit of the at least one parameter, the bit to correspond to the first hash value; and generating the error message based on a value of the bit.

In at least one embodiment, a system comprises a system memory to store a first instruction, the first instruction comprising an opcode and at least one parameter, the opcode to identify the first instruction as an instruction associated with an indirect branch, the at least one parameter indicative of whether the indirect branch is allowed; and a processor coupled to the system memory, the processor comprising a decoder to decode the first instruction; and circuitry to generate an error message based on the at least one parameter.

In an embodiment, the system further comprises a memory controller to request the first instruction from the system memory. In an embodiment, further comprising a network interface controller to receive the first instruction over a network. In an embodiment, the system further comprises a network interface controller to receive software code; and a compiler to compile the software code to generate the first instruction. In an embodiment, the at least one parameter indicates a size of an address range. In an embodiment, the circuitry is to determine an offset between an address of a second instruction to specify the indirect branch and an address of the first instruction; and generate the error message if the offset is larger than the size of the address range. In an embodiment, the at least one parameter comprises a multiplier and a granularity bit, wherein the size of the address range is the product of the multiplier and a granularity size, the granularity size corresponding to a value of the granularity bit. In an embodiment, the first instruction further comprises a binary indicator to specify a scope of allowed indirect branches. In an embodiment, the at least one parameter comprises a set of bits that each correspond to a hash value. In an embodiment, the circuitry is to hash a second instruction to generate a first hash value; determine a bit of the at least one parameter, the bit to correspond to the first hash value; and generate the error message based on a value of the bit.

In at least one embodiment, a system comprises means for decoding a first instruction, the first instruction comprising an opcode and at least one parameter, the opcode to identify the first instruction as an instruction associated with an indirect branch, the at least one parameter indicative of whether the indirect branch is allowed; and means for generating an error message based on the at least one parameter. In an embodiment, the at least one parameter indicates a size of an address range. In an embodiment, the system further comprises means for determining an offset between an address of a second instruction to specify the indirect branch and an address of the first instruction; and means for generating the error message if the offset is larger than the size of the address range. In an embodiment, the at least one parameter comprises a multiplier and a granularity bit, wherein the size of the address range is the product of the multiplier and a granularity size, the granularity size corresponding to a value of the granularity bit. In an embodiment, the first instruction further comprises a binary indicator to specify a scope of allowed indirect branches. In an embodiment, the at least one parameter comprises a set of bits that each correspond to a hash value. In an embodiment, the system further comprises means for hashing a second instruction to generate a first hash value; means for determining a bit of the at least one parameter, the bit to correspond to the first hash value; and means for generating the error message based on a value of the bit.

In at least one embodiment, a non-transitory machine readable storage medium has instructions stored thereon, the instructions when executed by a machine to cause the machine to generate a first instruction to specify an indirect branch and a location to store a target of the indirect branch; and generate a second instruction to be the target of the indirect branch, the second instruction comprising an opcode and at least one parameter, the opcode to identify the second instruction as a target of an indirect branch, the at least one parameter indicative of whether the first instruction is allowed to branch to the second instruction.

In an embodiment, the at least one parameter indicates a size of a module of the second instruction. In an embodiment, the at least one parameter comprises a multiplier and a granularity bit, wherein the size of the module of the second instruction is the product of the multiplier and a granularity size, the granularity size corresponding to a value of the granularity bit. In an embodiment, the second instruction further comprises a binary indicator to specify whether indirect branches to the second instruction are allowed from outside of a module of the second instruction. In an embodiment, the instructions when executed by a machine to cause the machine to calculate a hash of the first instruction; and set a bit of the at least one first parameter of the second instruction, the bit corresponding to the calculated hash.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
a decoder to decode a first instruction, the first instruction comprising an opcode and at least one parameter, the opcode to identify the first instruction as an instruction associated with an indirect branch, the at least one parameter comprising information associated with a hash of a source instruction authorized for the indirect branch; and
circuitry to generate an error message based on the at least one parameter in the event of an unauthorized indirect branch.

2. The processor of claim 1, wherein the at least one parameter comprises a set of bits that each correspond to a distinct hash value.

3. The processor of claim 2, wherein the at least one parameter comprises 16 bits, wherein each bit of the 16 bits corresponds to a distinct value of a 4-bit output of a hash function.

4. The processor of claim 1, wherein the circuitry is to:
hash a second instruction to generate a first hash value;
determine a bit of the at least one parameter that corresponds to the first hash value; and
generate the error message based on a value of the bit.

5. The processor of claim 1, wherein:
the decoder is to decode a second instruction, the second instruction comprising a second opcode, the second opcode to identify the first instruction as an instruction associated with a second indirect branch, the second instruction not comprising information associated with a hash of a source instruction authorized for the second indirect branch; and
the circuitry to allow the second indirect branch based on the second opcode.

6. The processor of claim 1, wherein a first portion of the opcode identifies the first instruction as an endbranch instruction and a second portion of the opcode distinguishes between a 32-bit mode and a 64-bit mode of the processor.

7. The processor of claim 1, wherein the processor is communicatively coupled to at least one of a battery, a display, or a network interface.

8. A system comprising:
a system memory to store a first instruction, the first instruction comprising an opcode and at least one parameter, the opcode to identify the first instruction as an instruction associated with an indirect branch, the at least one parameter comprising information associated with a hash of a source instruction authorized for the indirect branch; and
a processor coupled to the system memory, the processor comprising:
a decoder to decode the first instruction; and
circuitry to generate an error message based on the at least one parameter in the event of an unauthorized indirect branch.

9. The system of claim 8, further comprising a memory controller to request the first instruction from the system memory.

10. The system of claim 8, further comprising a network interface controller to receive the first instruction over a network.

11. The system of claim 8, further comprising:
a network interface controller to receive software code; and
a compiler to compile the software code to generate the first instruction.

12. The system of claim 8, wherein the at least one parameter comprises a set of bits that each correspond to a distinct hash value.

13. The system of claim 8, wherein the circuitry is to:
hash a second instruction to generate a first hash value;
determine a bit of the at least one parameter that corresponds to the first hash value; and
generate the error message based on a value of the bit.

14. A non-transitory machine readable storage medium having instructions stored thereon, the instructions when executed by a machine to cause the machine to:
generate a first instruction to specify an indirect branch; and
generate a second instruction to be the target of the indirect branch, the second instruction comprising an opcode and at least one parameter, the opcode to identify the second instruction as a target of an indirect branch, the at least one parameter comprising information associated with a hash of the first instruction.

15. The medium of claim 14, the instructions when executed by a machine to cause the machine to:
calculate a hash of the first instruction; and
set a bit of the at least one parameter of the second instruction, the bit corresponding to the calculated hash.

16. The medium of claim 14, the instructions when executed by a machine to cause the machine to:
    generate a third instruction to specify a second indirect branch, wherein the second instruction is the target of the second indirect branch and the at least one parameter comprises information associated with a hash of the third instruction.

17. The medium of claim 14, wherein the at least one parameter comprises a set of bits that each correspond to a distinct hash value.

18. The medium of claim 17, wherein the at least one parameter comprises 16 bits, wherein each bit of the 16 bits corresponds to a distinct value of a 4-bit output of a hash function.

19. The medium of claim 14, wherein a first portion of the opcode identifies the first instruction as an endbranch instruction.

20. The medium of claim 14, the instructions when executed by a machine to cause the machine to:
    generate a third instruction to specify a second indirect branch; and
    responsive to determining that the second indirect branch is an inter-module indirect branch, generate a fourth instruction to be the target of the second indirect branch, the second instruction comprising an opcode, the second instruction not including information associated with a hash of the first instruction.

* * * * *